US012701155B2

(12) United States Patent
Chen et al.

(10) Patent No.: US 12,701,155 B2
(45) Date of Patent: Aug. 4, 2026

(54) NETWORK ARCHITECTURE FOR ARTIFICIAL INTELLIGENCE MODEL PROTECTION

(71) Applicant: Intel Corporation, Santa Clara, CA (US)

(72) Inventors: Luhai Chen, Shanghai (CN); Bing Zhu, Minhang (CN); Ned M. Smith, Beaverton, OR (US); Yang Huang, Shanghai (CN); Shaopu Yan, Shanghai (CN); Xueyan Zhao, Shanghai (CN); Naveen Aerrabotu, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 18/870,790

(22) PCT Filed: Jul. 1, 2022

(86) PCT No.: PCT/CN2022/103350
§ 371 (c)(1),
(2) Date: Dec. 2, 2024

(87) PCT Pub. No.: WO2024/000571
PCT Pub. Date: Jan. 4, 2024

(65) Prior Publication Data
US 2025/0254207 A1 Aug. 7, 2025

(51) Int. Cl.
H04L 67/10 (2022.01)
H04L 9/08 (2006.01)
(Continued)

(52) U.S. Cl.
CPC ............ H04L 67/10 (2013.01); H04L 9/0822 (2013.01); H04L 63/0435 (2013.01)

(58) Field of Classification Search
CPC .... H04L 67/10; H04L 9/0822; H04L 63/0435
See application file for complete search history.

(56) References Cited

U.S. PATENT DOCUMENTS

2020/0104636 A1 4/2020 Halevi et al.
2020/0234198 A1 7/2020 Feng et al.
(Continued)

FOREIGN PATENT DOCUMENTS

CN 113472805 A 10/2021
CN 114500054 A 5/2022
(Continued)

OTHER PUBLICATIONS

"International Application Serial No. PCT/CN2022/103350, International Search Report mailed Dec. 21, 2022", 4 pgs.
(Continued)

*Primary Examiner* — Nazia Naoreen
(74) *Attorney, Agent, or Firm* — Schwegman Lundberg & Woessner, P.A.

(57) ABSTRACT

A remote (e.g., cloud, edge-cloud) computing environment may be improved by configuring a client device to function as an extension of the cloud computing environment, such as by coordinating the execution and processing of data on the client device. Secure content or privacy-sensitive content is protected confidentially while in a cloud computing environment or client device, and may be moved to a client device and decrypted to a client local container for various user productivity processing workloads, thereby reducing or eliminating privacy concerns. This solution also provides improved security for sharing and usage of pre-trained AI models on a client device, such as by extending attestation and provisioning capabilities from cloud computing environment into clients, and by leveraging cloud computing technology on clients that protects cloud assets. This provides an improved ability to protect trained AI models and (Continued)

avoid exposing an AI model training process on a client device.

20 Claims, 12 Drawing Sheets

(51) Int. Cl.
H04L 9/10 (2006.01)
H04L 9/40 (2022.01)

(56) References Cited

U.S. PATENT DOCUMENTS

| | | | |
|---|---|---|---|
| 2021/0150411 A1* | 5/2021 | Coenders | G06F 21/6209 |
| 2022/0060455 A1* | 2/2022 | Rosenstein | H04L 9/0894 |
| 2022/0114014 A1* | 4/2022 | Chen | G06F 9/5066 |
| 2022/0114249 A1 | 4/2022 | Grancharov et al. | |

FOREIGN PATENT DOCUMENTS

| | | |
|---|---|---|
| CN | 119317920 | 1/2025 |
| WO | 2021247448 | 12/2021 |
| WO | WO-2024000571 A1 | 1/2024 |

OTHER PUBLICATIONS

"International Application Serial No. PCT/CN2022/103350, Written Opinion mailed Dec. 21, 2022", 4 pgs.
"International Application Serial No. PCT CN2022 103350, International Preliminary Report on Patentability mailed Jan. 16, 2025", 5 pgs.
"DICE Trusted Computing Group", [Online]. Retrieved from the Internet https web.archive. org web 20211130205853 https trustedcomputinggroup.org work-groups dice-architectures , Archived Nov. 30, 2021, 1 pages.
"Intel Enhanced Privacy ID EPID Security Technology", [Online]. Retrieved from the Internet https www.intel.com content www us en developer articles technical intel-enhanced-privacy-id-epid-security-technology.html, Jul. 13, 2021, 11 pages.
"Trusted Platform Module TPM", [Online]. Retrieved from the Internet https web.archive. org web 20211130065148 https trustedcomputinggroup.org work-groups trusted-platform-module , Archived Nov. 30, 2021, 1 pages.
"Virtualization Based Security", [Online]. Retrieved from the Internet https web.archive.org web 20211216181006 https docs.microsoft. com en-us windows-hardware design device-experiences oem-vbs, Feb. 5, 2021, 4 pages.
"Intel Trusted Execution Technology Intel TXT Overview", [Online]. Retrieved from the Internet https web.archive.org web 20211105155904 https www.intel.com content www us en support articles 000025873 technologies.html, Mar. 9, 2018, 4 pages.
"System Management Mode", [Online]. Retrieved from the Internet https web.archive.org web 20211206042205 https en.wikipedia.org wiki System_Management_Mode, Archived Dec. 6, 2021, 5 pages.
"Security Protocol and Data Model SPDM Specifciations", [Online]. Retrieved from the Internet https www.dmtf.org sites default files standards documents DSP0274_1.1.1.pdf, May 24, 2021, 134 pages.
"DICE Attestation Architecture", Version 1.00 Revision 0.22 [Online]. Retrieved from the Internet https trustedcomputinggroup.org wp-content uploads TCG_DICE_Attestation_Architecture_r22_02dec2020. pdf, Sep. 18, 2020, 36 pages.
"European Application Serial No. 22948671.7, Extended European Search Report mailed Nov. 14, 2025", 7 pgs.
Birkholz, H, "Remote Attestation Procedures Architecture draft-ietf-rats-architecture-14", [Online]. Retrieved from the Internet https www.rfc-editor.org rfc rfc9334. pdf, Dec. 9, 2021, 47 pages.
Mcmahan, Brendan, "Federated Learning Collaborative Machine Learning without Centralized Training Data", Google AI Blog, [Online]. Retrieved from the Internet URL https ai.googleblog.com 2017 04 federated-learning-collaborative.html, Apr. 6, 2017, 4 pgs.

* cited by examiner

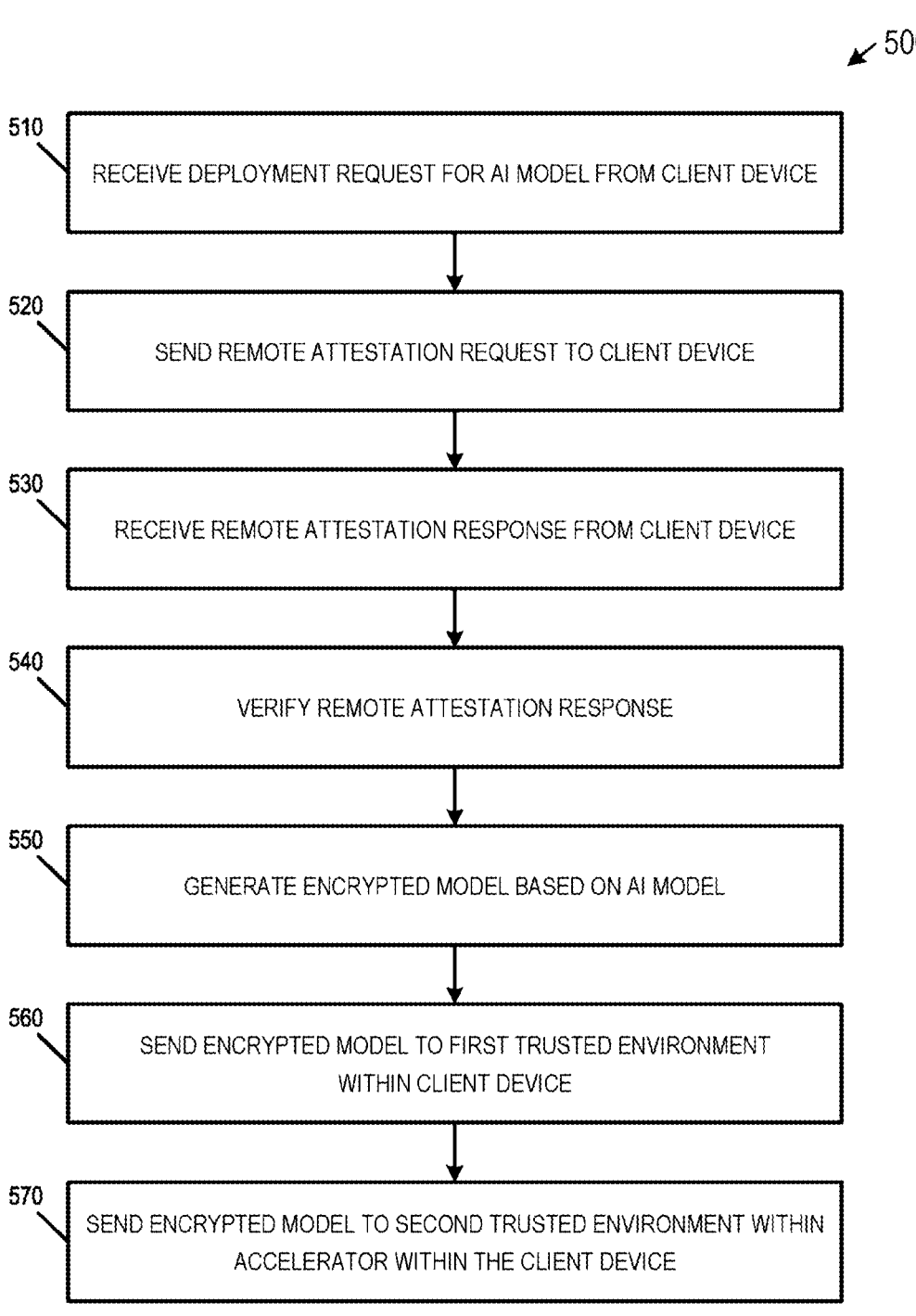

500

510  RECEIVE DEPLOYMENT REQUEST FOR AI MODEL FROM CLIENT DEVICE

520  SEND REMOTE ATTESTATION REQUEST TO CLIENT DEVICE

530  RECEIVE REMOTE ATTESTATION RESPONSE FROM CLIENT DEVICE

540  VERIFY REMOTE ATTESTATION RESPONSE

550  GENERATE ENCRYPTED MODEL BASED ON AI MODEL

560  SEND ENCRYPTED MODEL TO FIRST TRUSTED ENVIRONMENT WITHIN CLIENT DEVICE

570  SEND ENCRYPTED MODEL TO SECOND TRUSTED ENVIRONMENT WITHIN ACCELERATOR WITHIN THE CLIENT DEVICE

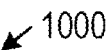
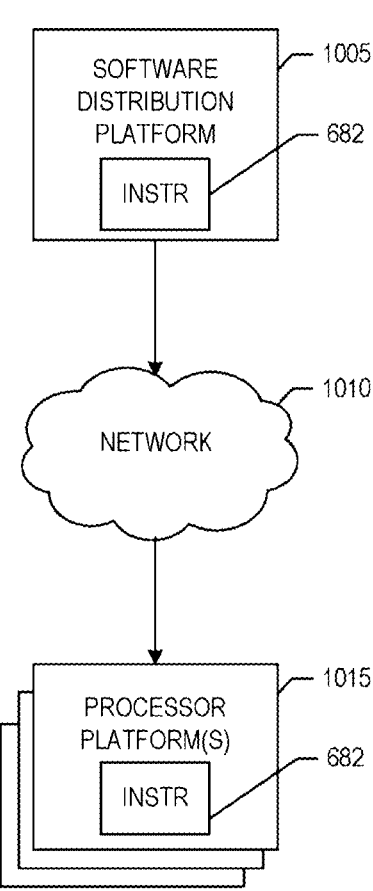
FIG. 10

NETWORK ARCHITECTURE FOR ARTIFICIAL INTELLIGENCE MODEL PROTECTION

This application is a U.S. National Stage Application under 35 U.S.C. 371 from International Application No. PCT/CN2022/103350, filed Jul. 1, 2022, and published as WO 2024/000571 on Jan. 4, 2024, which application is incorporated herein by reference in its entirety.

TECHNICAL FIELD

Embodiments described herein relate to cloud computing resource management.

BACKGROUND

Software and other electronic services are increasingly being executed in cloud computing environments (e.g., in "the Cloud"). However, this usage approach has many challenges, such as higher cost for cloud service providers (CSPs), high network latency for software execution, exclusion of offline uses, user privacy or confidentiality concerns, and other challenges. In a privacy example, when using a Cloud tool (e.g., Office 365) to create private or classified content online, functions such as autofill, speech-to-text, and grammar checking are all running in the Cloud. When creating private or classified content online, the information may inadvertently be disclosed publicly when raw confidential content is sent through a network to the Cloud and analyzed for grammar, spell checking, or other analysis or suggestions. This may subject service providers to an increased risk of violating privacy regulations, such as General Data Protection Regulation (GDPR).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 5 is a flow diagram illustrating a method for cloud computing provisioning of a trained artificial intelligence model within an edge/cloud computing environment, according to an embodiment.

FIG. 10 illustrates an example software distribution platform to distribute software, according to an embodiment.

DETAILED DESCRIPTION

Figure 1:
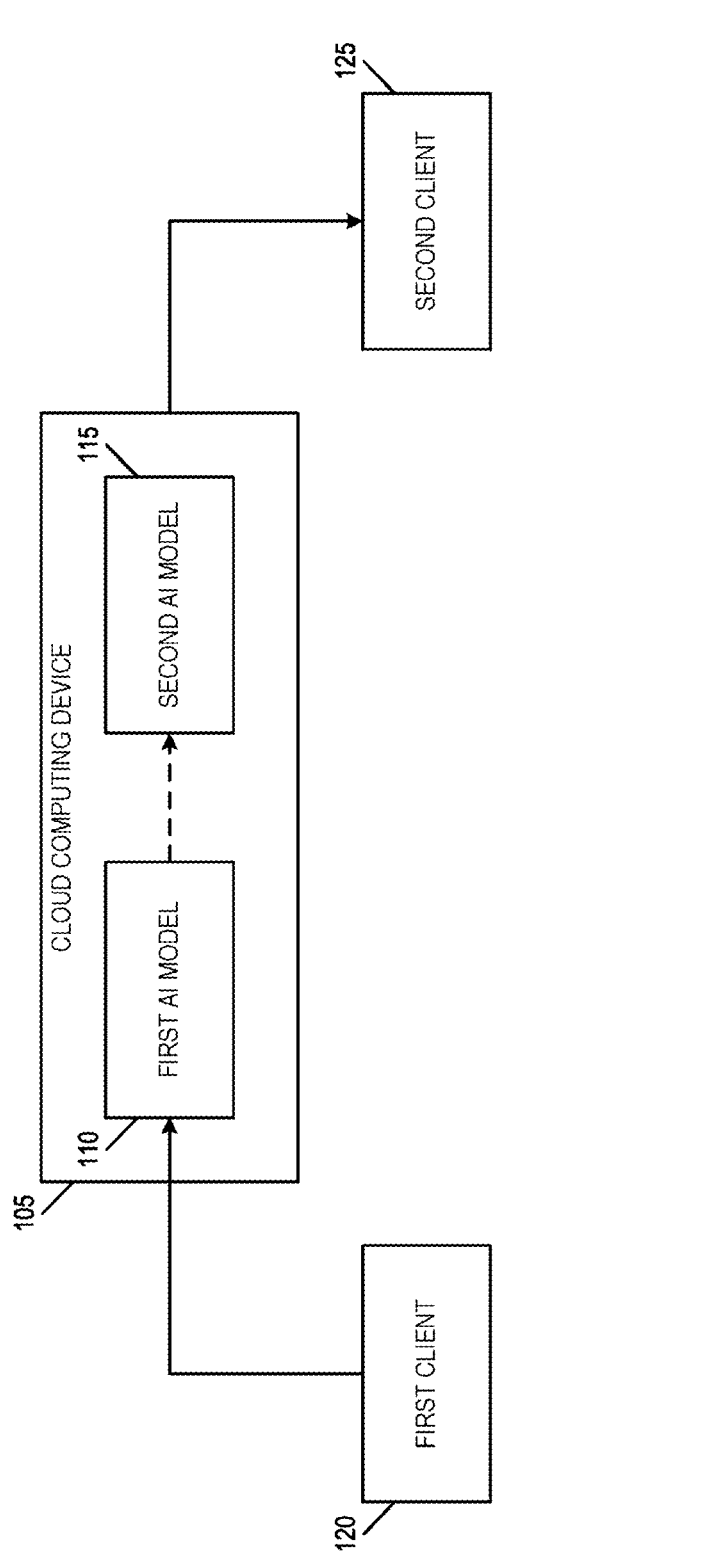
FIG. 1 is a block diagram illustrating a first cloud computing environment, according to an embodiment.

Technical solutions to technical problems facing cloud computing environments may include leveraging one or more client devices (e.g., user devices) for hosting and executing cloud services. A client device may be configured to behave like an extension of a cloud computing environment. In an example solution, cloud services may be moved from a remote computing environment to a more local computing environment without losing the benefits of remote processing provided by cloud computing or edge computing environments. The cloud services may be moved from a cloud server to a client device, from a cloud server to an edge computing system, or from an edge computing system to a client device. This may be used to provide various cloud services, such as local voice assist, speech recognition, natural language processing, local AI or artifact removal for video conference collaboration, multi-camera stitch, generative AI for creative assistance, and other cloud services.

By shifting cloud services to a client device, end users may avoid sending their secure or privacy-sensitive content to a cloud computing environment for processing. Instead, secure content or privacy-sensitive content is protected confidentially while in a cloud computing environment or client device, and may be moved to a client device and decrypted to a client local container for various user productivity processing workloads, thereby reducing or eliminating privacy concerns. This solution may also improve response time, such as by reducing network latency, working in offline modes, and reducing cloud computing environment data center costs.

This solution also provides improved security for sharing and usage of pre-trained AI models. IP protection for cloud computing environment providers in a zero-trust computing environment may expose pre-trained AI models to client devices. The AI model IP may be extracted, reverse engineered, or debugged if running on untrusted client environments. AI models may execute in cloud service provider (CSP) servers with limited exposure to tenants (e.g., client users). The solutions described herein protect CSP assets (e.g., pre-trained AI models) on client systems by extending attestation and provisioning capabilities from cloud computing environment into clients, and by leveraging cloud computing technology on clients that protects CSP assets. This provides an improved ability to protect trained AI models and avoid exposing an AI model training process on a client device.

These technical solutions may include device attestation, which may be used to protect CSP assets on a client device. This attestation may allow cloud service providers (e.g., CSP, owners of AI models) to have confidence to trust a cloud device before deploying the AI models to client device. These technical solutions may include an AI workload isolation, which may be used to isolate AI workloads from one another and from the rest workloads of client system applications. This isolation may be used to prevent the malicious applications in a client device from accessing assets of local AI workload and date or code. Using the attestation, a system may allow CSPs to deploy (e.g., provision, instantiate, configure) encrypted AI models from a remote server (e.g., cloud server, edge computing system) to a cloud device (e.g., local device). Using workload isolation, the local AI inference engine (e.g., in isolated protected environment) may decrypt the AI models safely and use those models to perform AI tasks locally.

These technical solutions may include a local AI model confidentiality solution. This confidentiality solution may be used to protect AI workload pre-trained models in client devices, which applies to both data in memory (e.g., DRAM) and data at rest with standard encryption algorithms. The confidentially solution may include a local sealing mechanism with attestation evidence to derive a wrapper key for protecting a key encryption key (KEK) at local storage for offline next use.

These technical solutions provide various benefits to end users and CSPs. One benefit includes improving security for cloud providers and their IP asset protections when AI models are deployed in an untrusted client device. This improved security may reduce a cost of servers, as a reduced AI workload frees up cloud server resources that can be provided. By providing the ability for cloud providers to deploy AI workloads to client device, these solutions improve end user experience, such as by providing offline use and improved network performance (e.g., reduced network throughput requirements). This may also be used to reduce privacy concerns by processing contents locally in a protected AI workload on a local client device.

In the following description, for purposes of explanation, numerous specific details are set forth in order to provide a thorough understanding of some example embodiments. It will be evident, however, to one skilled in the art that the present disclosure may be practiced without these specific details.

FIG. 1 is a block diagram illustrating a first cloud computing environment 100, according to an embodiment. Cloud computing environment 100 includes a cloud computing device 105, such as a cloud server, cloud processor, edge computing system, or other cloud computing device. The cloud computing device 105 may be used to execute a first artificial intelligence (AI) model 110 and a second AI model 115. The first AI model 110 may receive an input from a first client device 120 and provide intermediate data to the second AI model 115. The second AI model 115 may provide output data to a second client device 125. In another example, the second AI model 115 may provide output data back to the first client device 120, such as to provide feedback to the first client device 120 or for improving one or more processes being executed on the first client device 120.

In an example, the first client device 120 includes an audio/video (A/V) capture device such as a webcam and microphone, which may be used during a video conference. The first client device 120 provides A/V data to the cloud computing device 105. The first AI model 110 within the cloud computing device 105 may process the A/V data, which may include processing A/V data to provide noise suppression, object segmentation, background substitution (e.g., background blurring), or other A/V processing. The first AI model 110 may provide its processed A/V output data to the second AI model 115 to prepare the data for the second client device 125, such as language translation, resolution upscaling, or other device-specific processing for the second client device 125. The cloud computing device 105 may provide this processed A/V data to the second client device 125 to produce audio and display video.

Figure 2:
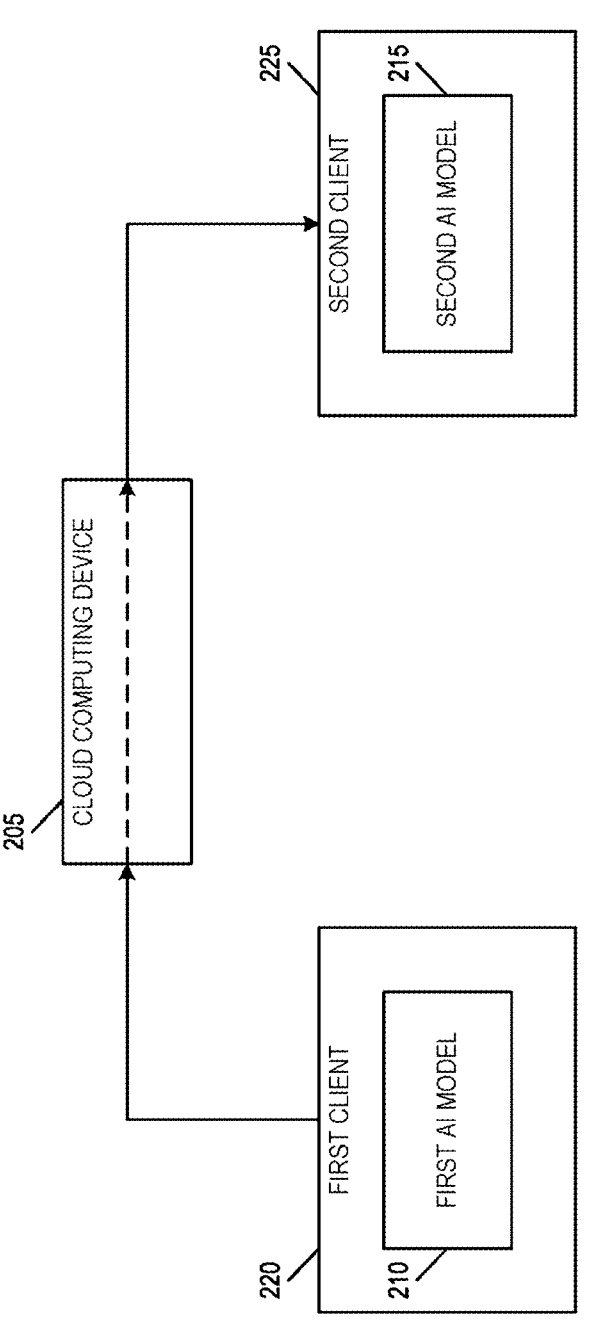
FIG. 2 is a block diagram illustrating a second cloud computing environment, according to an embodiment.

FIG. 2 is a block diagram illustrating a second cloud computing environment 200, according to an embodiment. Cloud computing environment 200 includes a cloud computing device 205, a first client device 220 configured to execute a first AI model 210, and a second client device 225 configured to execute a second AI model 215. This is in contrast with the cloud computing device 105 shown in FIG. 1, where the cloud computing device 105 may execute both the first AI model 110 and the second AI model 115. Client devices 220, 225 may include mobile devices, user equipment (UE), autonomous vehicle platforms, kiosks, personal computers, or other client devices.

The first client device 220 may generate data locally for input into the first AI model 210. In an example, the first client device 220 includes an A/V capture device, and the first AI model 210 within the first client device 220 may provide local processing of the A/V data, such as processing A/V data to provide noise suppression, object segmentation, background substitution, or other local A/V processing using the first AI model 210. The first client device 220 may provide data generated by the first AI model 210 through the cloud computing device 205 to second client device 225 to be used in the second AI model 215. The second client device 225 may receive the data and provide local processing in the second AI model 215, such as language translation, resolution upscaling, or other processing specific to the hardware or software on second client device 225. In an example, the second client device 225 includes a remote electronic device, and the second AI model 215 may be used to provide real-time audible language translation and resolution upscaling to produce audio and display video on the second client device 225.

Cloud computing environment 200 may be configured for secure deployment of the first AI model 210 and the second AI model 215. This may include secure deployment of encrypted copies of the AI models (e.g., AI workloads) from the cloud computing environment 200 to each of the first client device 220 and the second client device 225. After deployment, the AI models are loaded, decrypted, and executed in an isolated (e.g., protected) environment in each of the first client device 220 and the second client device 225. This secure deployment is shown and described further with respect to FIG. 3.

Figure 3:
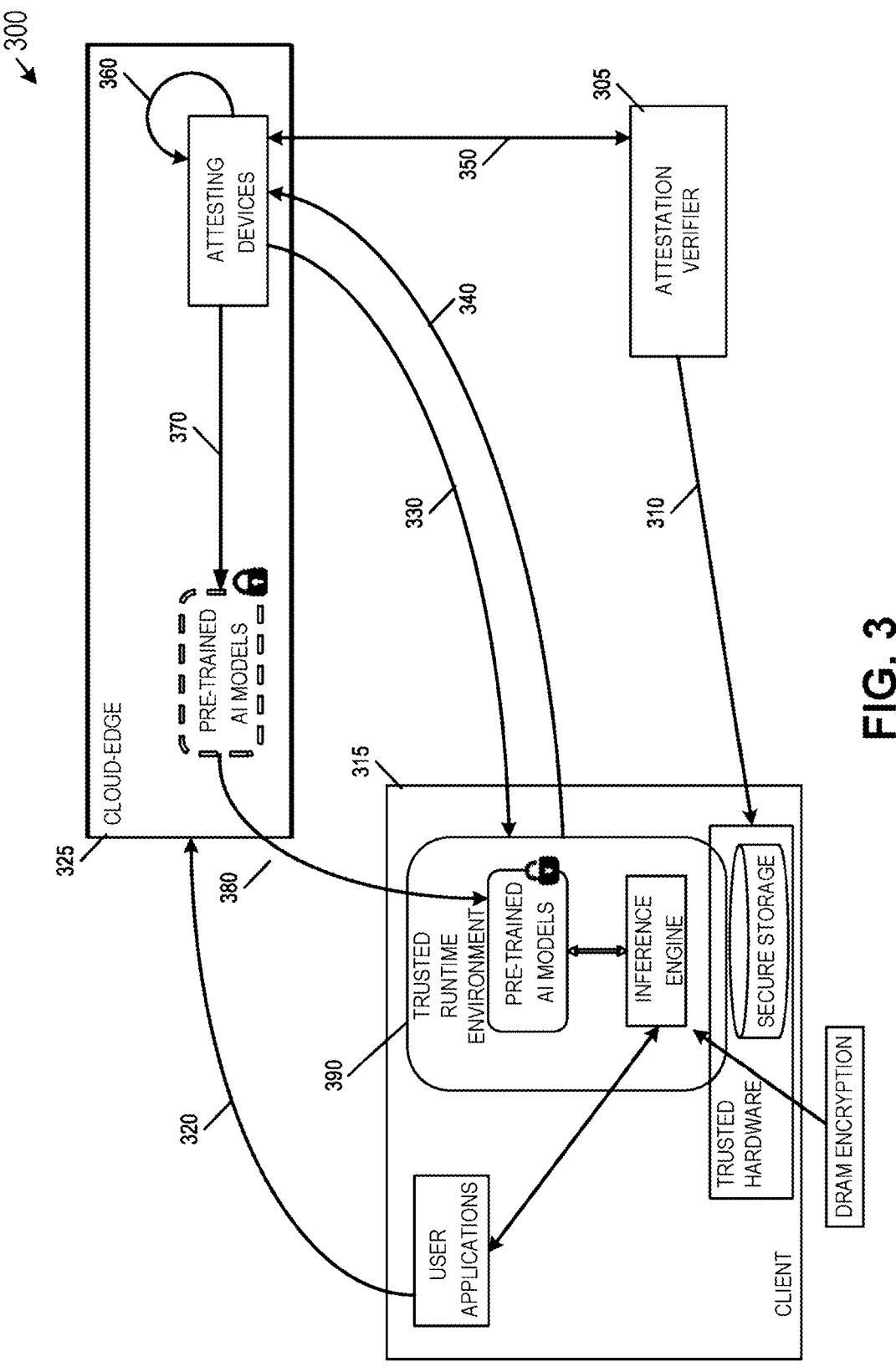
FIG. 3 is a block diagram illustrating a secure AI model deployment method and apparatus, according to an embodiment.

FIG. 3 is a block diagram illustrating a secure AI model deployment method and apparatus 300, according to an embodiment. A cloud-edge device 325 may be used for secure provisioning of one or more pre-trained AI models from the cloud-edge device 325 to a client device 315. While the cloud-edge device 325 is shown as an example remote cloud computing device and the client device 315 is shown as an example local computing device, the method and apparatus 300 may also be used to provide secure AI model deployment between a cloud server and an edge computing system or between an edge computing system and a client device. The cloud-edge device 325 may include a physical or logical processing device, which may be located within a cloud computing environment, within one or more edge nodes along the edge of a network, or may be disaggregated (e.g., distributed) among one or more distributed units (DU) located on the network (e.g., between and including the cloud and far edge). Similarly, the client device 315 may include a physical or logical processing device that is local to or remote from the user but controlled by the client, such as electronic user equipment, a mobile device, an endpoint device, an endpoint node, or other user device.

At step 310, an attestation key may be provisioned (e.g., provided) from an attestation verifier 305 to a client device 315. The attestation verifier 305 may include an attestation verification node (e.g., cloud-edge device), an attestation verification software-as-a-service (SAAS), an attestation verification device, or another attestation verification logical or physical provisioning entity. While FIG. 3 shows the attestation verifier 305 separate from the cloud-edge device 325 and separate from the client device 315, the attestation verifier 305 may be physically or logically within the cloud-edge device 325 or within the client device 315. In an example, the attestation verifier 305 generates the attestation key and provisions the key into client device 315 at the time of manufacturing or deployment. The attestation verifier 305 may generate the attestation key to be specific to the client device 315, such as using a device identification number or other uniquely identifiable characteristic to generate the attestation key. The attestation verifier 305 may include a closed system, in which only one party has control over the ability to generate or provision attestation keys. The attestation verifier 305 may include an open attestation system, in which multiple parties may have the ability to generate or provision attestation keys, such as to share user-developed AI models among users.

The attestation key may include a symmetric key or an attestation key pair to provide an asymmetric key. The client device 315 may include trusted hardware, and the key may be stored within secure storage within trusted hardware. The attestation key may be stored such that it can be accessed only by a trusted runtime environment such as a trusted execution environment (TEE), which may include storing within in a confidentiality-protected memory (e.g., secure DRAM or secure flash storage) at rest on this client device 315. The client device 315 may include integrity protection, such as Hardware Root of Trust (HW ROT). The provisioning at step 310 may be performed once for each client device 315, such as provisioning in the factory during manufacturing or in the field during initial configuration. A key replacement process may be used to change the key provisioned in step 310.

At step 320, before a cloud service is installed and used on client device 315, a user application on the client device 315 may request access to the cloud service. The cloud service request may include a request for the cloud-edge device 325 to deploy an AI model to the client device 315 for local use at the client device 315.

At step 330, the cloud-edge device 325 may request remote attestation in response to receipt of the cloud service request. The cloud-edge device 325 needs to attest the client device 315 before deploying the AI models, so the cloud-edge device 325 send a remote attestation request from the cloud-edge device 325 to the client device 315.

At step 340, a trusted runtime in the client device 315 may respond to the attestation request. This response may include providing attestation evidence, such as like device integrity or measurement quotes signed by attestation key. The client device may include Remote Attestation Procedures Architecture, which may be used to generate this attestation response. The trusted runtime in the client device 315 may generate a unique device key pair and create an attestation certificate chain for this public key. The client device may include Device Identifier Composition Engine (DICE) Attestation Architecture, which may be used to generate the unique device key pair and create the attestation certificate chain. The private portion of the generated unique device key may be retained inside the trusted runtime environment, and may be used in step 390 to unwrap an Advanced Encryption Standard (AES) decryption key. The client device 315 may then send those generated attestation materials back to the cloud-edge device 325 for attestation.

At step 350, the cloud-edge device 325 may perform attestation verification. This attestation verification may be completed with the help of the attestation verifier 305.

At step 360, upon successful attestation of the client device 315, the cloud-edge device 325 may extract the unique public key. The unique public key may be extracted from attestation certificate chains created in step 340.

At step 370, the cloud-edge device 325 may generate a strong, random symmetric key (e.g., 256+ bit AES key). The cloud-edge device 325 may use this key to encrypt one or more requested pre-trained AI models. The cloud-edge device 325 may wrap the symmetric encryption key with the cloud device unique public key retrieved in step 360. By wrapping the symmetric encryption key with the unique public key, only a client device 315 that has been attested may unwrap the key because only that client device 315 has the private part of that unique device key pair.

At step 380, the cloud-edge device 325 may send the wrapped symmetric encryption key and the encrypted AI models to the client device 315. Because the symmetric encryption key is wrapped and the AI models are encrypted, they may be sent via untrusted network traffic without exposing either the symmetric encryption key or the AI models.

At A step 390, the client device 315 may receive the wrapped symmetric encryption key and unwrap the symmetric encryption key (e.g., decrypt the symmetric key) with the private part of unique device key pair generated in step 340. After unwrapping the symmetric encryption key, the client device 315 may use the unwrapped key to decrypt the AI models. Once the AI models are decrypted in memory of protected environment of the client device 315, they may be loaded and executed in this trusted runtime environment.

In order for AI models to be used offline, the trusted runtime in the client device 315 may save the encrypted AI models into local storage for later use. The encrypted AI models do not need to be saved in secure storage, as their encryption protects the AI models at rest. The decryption key may also be saved in internal local secure storage to keep it securely stored at rest, such as within secure storage provided by a trusted runtime (e.g., TEE), such as sealing using a Software Guard Extension (SGX) sealing mechanism. The encryption may be implemented such that encryption key is only accessible to the trusted runtime by sealing a key-wrapping encryption key (KEK) in the trusted runtime, where the KEK may be derived with a trusted runtime root key using attestation evidence values as an input to the key generation function. If the runtime environment changes (e.g., due to intentional malicious events, due to accidental events), then the trusted runtime may be prevented from regenerating the KEK and would not be able to decrypt the AI model upon next use, which provides further protection of the AI models.

When the AI model is deployed to client device 315, the device unique key pair generated in step 340 and the private part of that key pair may not need to be stored securely. After deployment, the key pair may be discarded permanently by secure erasing from DRAM or memory to prevent future attacks on the AI model.

The secure AI model deployment method and apparatus 300 provides the ability to safely provision one or more AI models into a client device 315. This provides improved security by allowing a risk-based approach that is conditional on attestation of the client device 315. This provides the ability to protect the AI model in transit, such as by encrypting and securely deploying the AI model. This also enables the AI model to be protected at runtime and at rest while the AI model is within a trusted runtime execution environment on a client device 315.

By securely provisioning and deploying the AI models into a client device 315, one or more applications running on the client device 315 may rely on AI analytics results even when the client device 315 is offline. This may provide an improved user experience and improved privacy for the user and for any user-generated content.

The steps shown in secure AI model deployment method and apparatus 300 may be repeated, such as to provide further synchronization between the local AI model and updated models in the cloud-edge device 325. Similarly, one or more AI models may continue to be trained at the client device 315, which provides the ability to reflect user-specific behavior in the model as a way to further improve user experiences, such as using collaborative machine learning (e.g., Federated learning) to train an AI model across multiple cloud servers or client devices without exchanging the AI model.

The secure AI model deployment method and apparatus 300 may include various security capabilities to support attestation and create the trusted runtime environment within the client device 315. The trusted runtime may use a trustworthy bootstrap of a trusted runtime environment that supports attestation such as DICE or SGX as described above. The attestation may include Enhanced Privacy ID (EPID) provisioning, Trusted Platform Module (TPM) key attestation, Trusted Domain Extension (TDX) provisioning, DICE, or other provisioning. The trusted runtime environment may be provided by virtualization-based trusted environment (e.g., Hyper-V based virtualization-based security (VBS), secure operating system (OS) Trusty), Trusted Execution Technology (TXT) hardware extensions, Software Guard Extensions (SGX), TDX, System Management Mode (SMM) (e.g., ring-2) operating modes, or other trusted environments.

The trusted runtime may be used to isolate and protect security-sensitive AI workloads while in use at the client device 315. Privacy-sensitive user data may be fed into an AI model in the trusted runtime without exposing the user data to snooping attacks in a cloud computing environment. Local acceleration hardware (e.g., GPU, vision processing unit (VPU), a Gaussian and Neural Accelerator (GNA)) may be used to offload local but protected operations. The trustworthiness equivalency of the local acceleration hardware may be assessed using Security Protocol and Data Model (SPDM) architecture, TDX architecture, or another trustworthiness verification architecture.

A secure communication path may be created between the trusted runtime and other trusted storage. Graphical processor units (GPUs) or other acceleration hardware (e.g., Protected Xe Path (PXP), SPDM, TDX), may be used such that an AI model workload is executed inside an attested trustworthy isolated runtime environment. The inference engine may be loaded as part of the bootstrap process and provisioned by the cloud-edge device 325 or another cloud computing environment. The AI models may be provisioned securely into the trusted runtime, then loaded and executed within the trusted runtime on the client device 315. The secure provisioning the encrypted AI model to the trusted runtime using an encryption key that only a valid trusted runtime can use to decrypt the AI model.

Similarly, the AI model may be encrypted using a key only accessible to the trusted runtime by sealing a KEK to the trusted runtime. This may be achieved by deriving a trusted runtime key using attestation evidence values as an input to a key generation function. To enable provisioning, the public KEK may be provided to the cloud-edge device 325 to wrap the AI model or to wrap a symmetric key used to encrypt the AI model. When the trusted runtime environment changes due to intentional malicious or accidental events, the trusted runtime may not be able to regenerate the KEK or decrypt the AI model upon next use. This KEK protection is maintained even during off-line operational mode, as the AI model remains encrypted while in local storage and can be decrypted only when a current runtime environment matches the original runtime environment.

The trusted runtime may be updated through a maintenance process that migrates or reprovisions AI Models. This migration may include measuring the new trusted runtime environment before it is fully installed and executed, then seeding the KEK key generation function using the new measurements using the current trusted runtime. The seed value may be used to generate a new KEK ($KEK_{NEW}$) while the current KEK ($KEK_{CUR}$) is still known. The $KEK_{CUR}$ may be used to decrypt the stored AI model or symmetric key. The $KEK_{NEW}$ may then be used to re-encrypt the AI model or symmetric key.

Multiple trusted environments (e.g., multiple SGX enclaves, multiple TDX guests) may be launched or executed in parallel to serve multiple clients or AI models. The use of multiple trusted environments may improve security and performance by isolating AI workloads from each other.

Memory encryption may be used to protect AI models in runtime (e.g., in DRAM or memory) and at rest in storage, such as using total memory encryption (TME), multi-key TME (MKTME), SGX built-in memory encryption, or other memory encryption. The secure storage may use on replay protected memory block (RPMB) storage to provide anti-replay protection whenever required, such as using RPMB in universal flash storage (UFS) or non-volatile memory express (NVMe) solid-state drive (SSD) storage.

Figure 4:
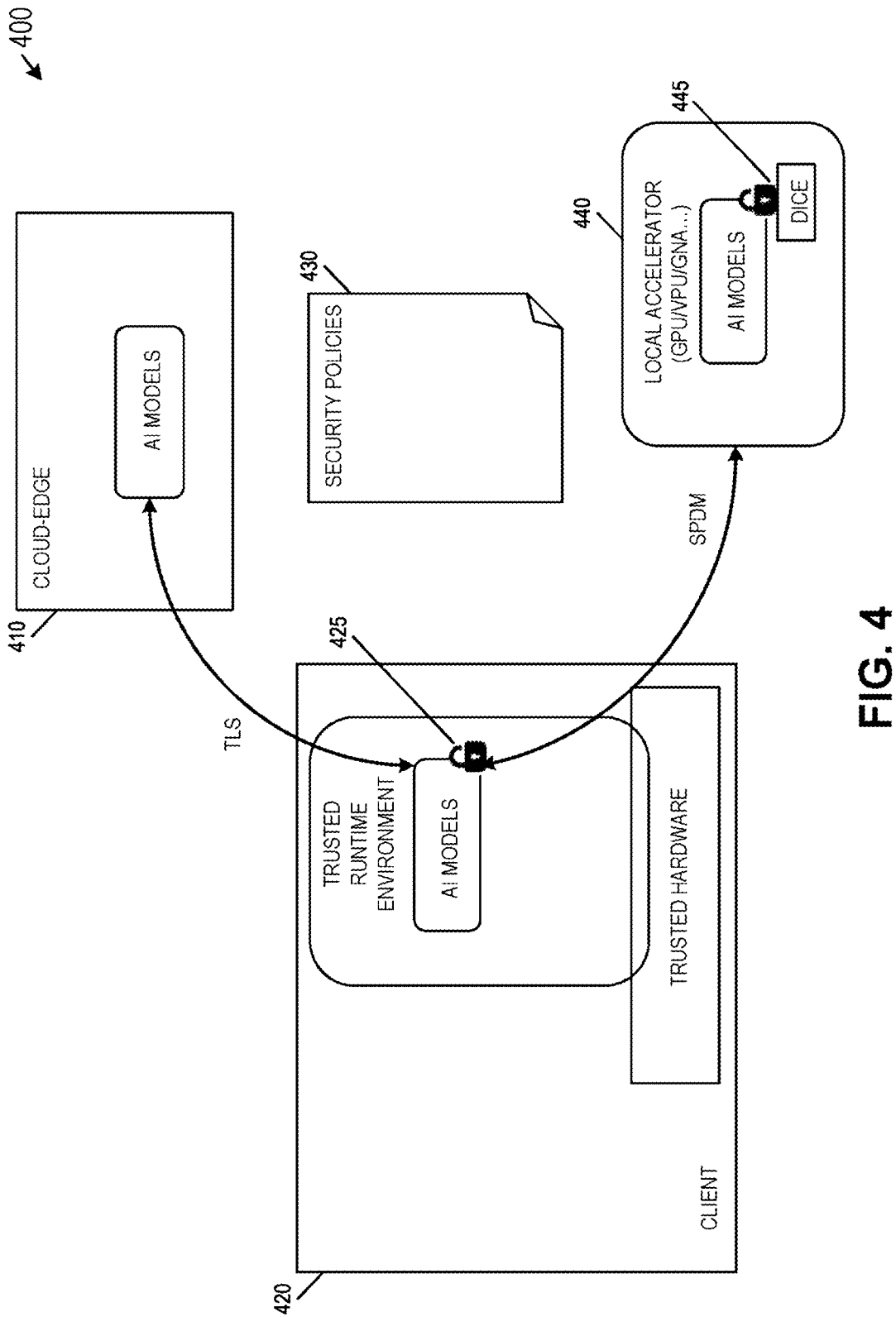
FIG. 4 is a block diagram illustrating local accelerator provisioning, according to an embodiment.

FIG. 4 is a block diagram illustrating accelerator provisioning 400, according to an embodiment. A cloud-edge device 410 may be used for secure provisioning of one or more pre-trained AI models from the cloud-edge device 410 to a client device 420. The client device 420 may store the AI model within a secure device environment 425. The client device 420 may convey the AI model to a secure accelerator environment 445 within a local accelerator 440 for storage. The local accelerator may include a graphical processing unit (GPU), a vision processing unit (VPU), a Gaussian Neural Accelerator (GNA), or other accelerator architecture. The secure device environment 425 may include a first security architecture that is specific to the client device 420, and the secure accelerator environment 445 may include a second security architecture that is specific to the local accelerator 440. In an example, the secure device environment 425 may employ an encryption and decryption method used by a general central processing unit (CPU) of the client device 420, and the secure accelerator environment 445 may employ an encryption and decryption method that is specific to the accelerator architecture, such as a GPU, VPU, GNA, or other accelerator architecture. A DICE root-of-trust with sealing may be implemented to prevent any client device 420 or local accelerator 440 from accessing AI models or other resources without proper attestation. The AI model may be sealed using a TPM or DPE (DICE Protection Module Environment) to enforce sealing or unsealing of the AI model.

When the AI model is requested, the local accelerator 440 may decrypt and run the AI model. This accelerator provisioning 400 of an AI model to a local accelerator 440 may be similar to the process for provisioning an AI model to a trusted runtime environment. Accelerator provisioning 400 may include attestation of the hardware of the local accelerator 440 for providing an isolated AI runtime and determining that the acceleration hardware environment is acceptable. The hardware of the local accelerator 440 may then be evaluated to verify its design or isolation properties. Upon verification, the AI model may be provisioned into a trusted environment within local accelerator 440.

One or more security policies 430 may be used to improve security at the client device 420 or at the local accelerator 440. The security policies 430 may be implemented and configured by CSPs, and may be used to determine a minimum required strength of cryptography algorithms, key sizes, modes, sources of entropy, or other security policy requirements. The security policies 430 may be enforced by a local trusted device environment such that the client device 420 or at the local accelerator 440 behave according to the security policies 430. The security policies 430 may be implemented using random numbers or other data generated using entropy functions executed at the cloud-edge device 410 or at the client device 420.

The attestation described herein may be used to assess and reduce risks associated with distribution of an AI model to the client device 420 or at the local accelerator 440. Similarly, federated learning may include a control plane to coordinate training and synchronizing the trained model across multiple federated nodes. AI model security may be improved using a trusted path (e.g., TLS, SPDM), such as a trusted path between a central controller in the cloud-edge device 410 and any client device 420 or local accelerator 440. A local training controller may be used to coordinate training among client devices 420 or local accelerators 440. The local controller may contribute the locally trained AI model to a cloud or peer node to benefit from peer training, which may cascade AI models or AI model data into the local accelerators 440. The security policies 430 may be used to determine a cryptographic strength, identity security, attested configuration security, or other security policy requirements that are to be used by one or more of the secure device environment 425 or the secure accelerator environment 445.

FIG. 5 is a flow diagram illustrating a method 500 for cloud computing provisioning of a trained artificial intelligence (AI) model. Method 500 includes receiving 510 a deployment request for an AI model from a client device. Method 500 includes sending 520 a remote attestation request to the client device in response to the deployment request. Method 500 includes receiving 530 a remote attestation response from the client device. Method 500 includes verifying 540 the remote attestation response. Method 500 includes generating 550 an encrypted model based on the AI model in response to verifying the remote attestation response. Method 500 includes sending 560 the encrypted model to a first trusted environment within the client device.

Method 500 may further include sending 570 the encrypted model to a second trusted environment associated with an accelerator within the client device. The first trusted environment may include a first security architecture specific to the client device, and the second trusted environment may include a second architecture that is specific to the accelerator and different from the first security architecture. Method 500 may further include generating a symmetric key to encrypt the AI model in response to verifying the remote attestation response, wherein the encrypted model is generated further based on the symmetric key. Method 500 may further include generating a wrapped key based on the symmetric key. Method 500 may further include sending the wrapped key to the client device.

Method 500 may further include provisioning an attestation key into a client computing device prior to receiving the deployment request. Provisioning the attestation key into the client computing device may include storing the attestation key within a confidentiality-protected client memory on the client device. The confidentiality-protected client memory may include at least one of a confidentiality-protected dynamic random-access memory and a confidentiality-protected flash storage. Receiving the remote attestation response may include receiving a device quote signed by the attestation key.

Method 500 may further include receiving a unique device key pair and an attestation certificate chain for the attestation key generated at the client device. Method 500 may further include extracting a public key from the attestation certificate chain subsequent to verifying the remote attestation response. Generating the wrapped key is further based on the public key. Verifying the remote attestation response may include sending the remote attestation response to an attestation verifier and receiving a remote attestation verification from the attestation verifier. Method 500 may further include receiving a trained model from the client device, the trained model generated by retraining the AI model at the client device.

Figure 6A:
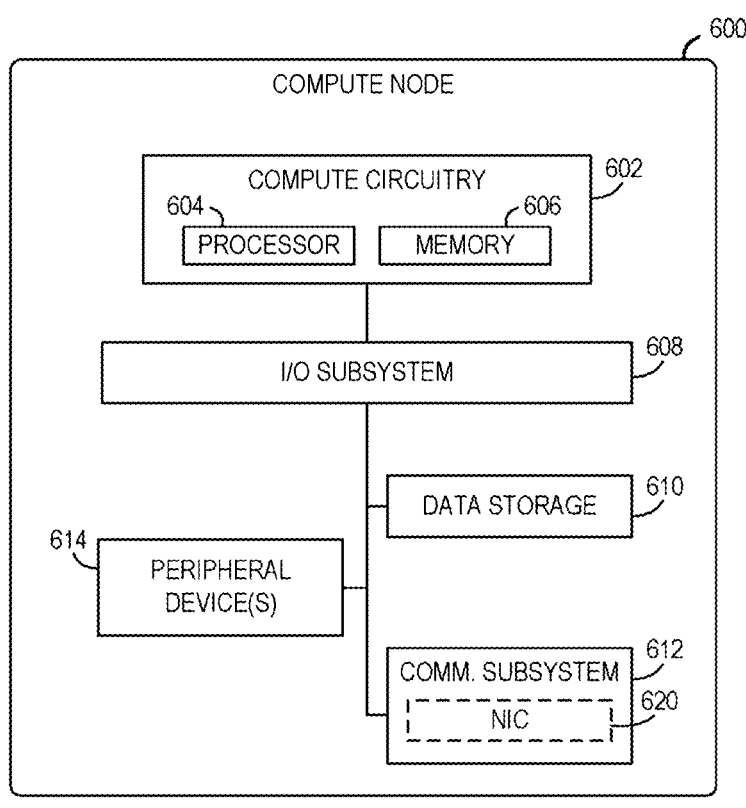
FIGS. 6A and 6B provide an overview of example components within a computing device in an edge computing system, according to an embodiment.
Figure 6B:
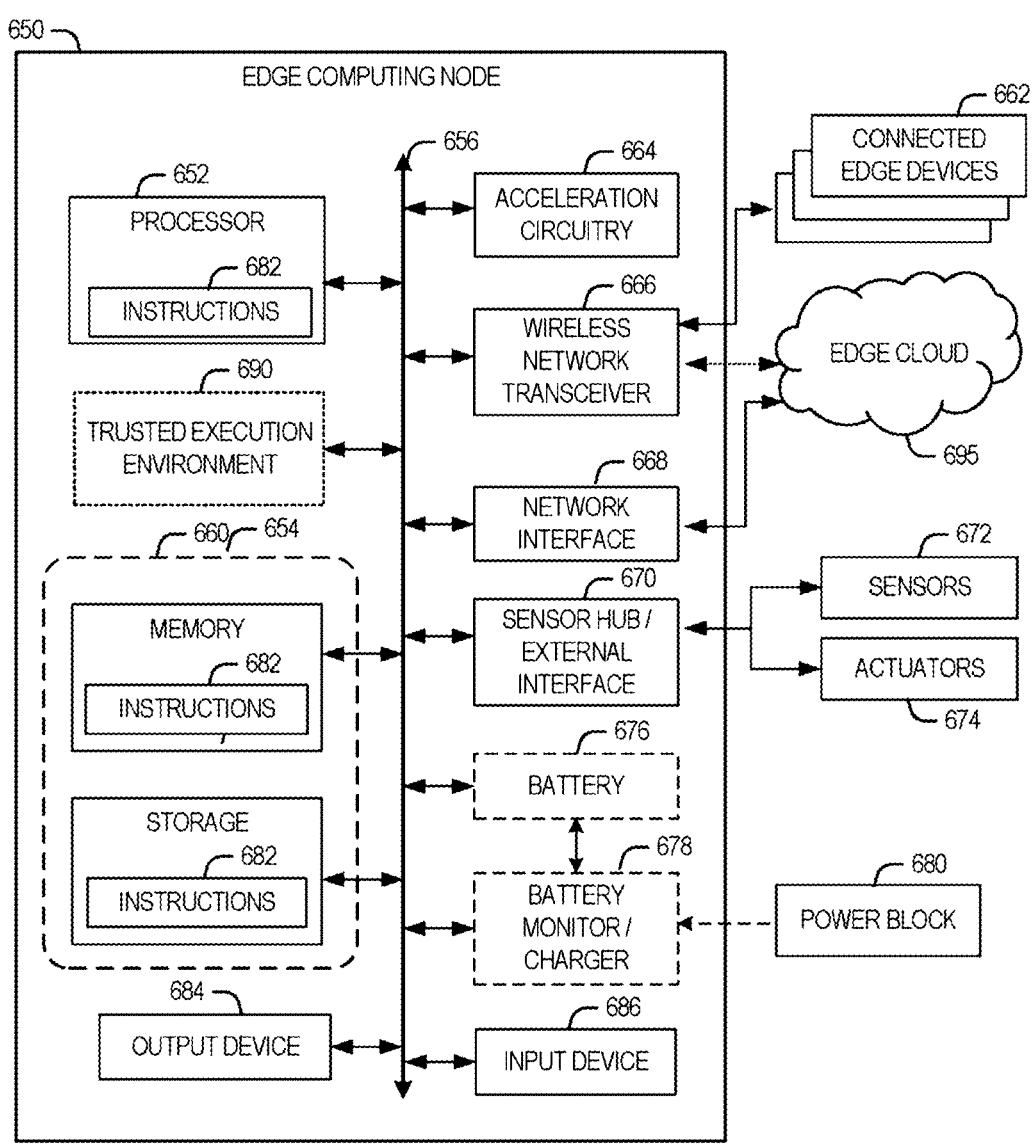

FIGS. 6A and 6B provide an overview of example components within a computing device in an edge computing system 600, according to an embodiment. Edge computing system 600 may be used to provide secure AI model deployment, such as using method and apparatus 300 shown and described above with respect to FIG. 3. In further examples, any of the compute nodes or devices discussed with reference to the present edge computing systems and environment may be fulfilled based on the components depicted in FIGS. 6A and 6B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

In the simplified example depicted in FIG. 6A, an edge compute node 600 includes a compute engine (also referred to herein as "compute circuitry") 602, an input/output (I/O) subsystem 608 (also referred to herein as "I/O circuitry"), data storage 610 (also referred to herein as "data storage circuitry"), a communication circuitry subsystem 612, and, optionally, one or more peripheral devices 614 (also referred to herein as "peripheral device circuitry"). In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 600 may be embodied as any type of engine, device, or collection of devices capable of performing various compute functions. In some examples, the compute node 600 may be embodied as a single device such as an integrated circuit, an embedded system, a field-programmable gate array (FPGA), a system-on-a-chip (SOC), or other integrated system or device. In the illustrative example, the compute node 600 includes or is embodied as a processor 604 (also referred to herein as "processor circuitry") and a memory 606 (also referred to herein as "memory circuitry"). The processor 604 may be embodied as any type of processor capable of performing the functions described herein (e.g., executing an application). For example, the processor 604 may be embodied as a multi-core processor(s), a microcontroller, a processing unit, a specialized or special purpose processing unit, or other processor or processing/controlling circuit.

In some examples, the processor 604 may be embodied as, include, or be coupled to an FPGA, an application specific integrated circuit (ASIC), reconfigurable hardware or hardware circuitry, or other specialized hardware to facilitate performance of the functions described herein. In some examples, the processor 604 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUS, programmed FPGAs, or ASICs tailored to implement an AI model such as a neural network). Such an xPU may be designed to receive, retrieve, and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general-purpose processing hardware. However, it will be understood that a xPU, a SOC, a CPU, and other variations of the processor 604 may work in coordination with each other to execute many types of operations and instructions within and on behalf of the compute node 600.

The memory 606 may be embodied as any type of volatile (e.g., dynamic random-access memory (DRAM), etc.) or non-volatile memory or data storage capable of performing the functions described herein. Volatile memory may be a storage medium that requires power to maintain the state of data stored by the medium. Non-limiting examples of volatile memory may include various types of random-access memory (RAM), such as DRAM or static random-access memory (SRAM). One particular type of DRAM that may be used in a memory module is synchronous dynamic random-access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 606 may be integrated into the processor 604. The memory 606 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0," set to logical "1," set to an intermediary resistance value) are accomplished by applying one or more current pulses to the at least two electrodes, in which the pulses have a particular current magnitude and duration. For instance, a long low current pulse (SET) applied to the at least two electrodes may cause the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 602 is communicatively coupled to other components of the compute node 600 via the I/O subsystem 608, which may be embodied as circuitry and/or components to facilitate input/output operations with the compute circuitry 602 (e.g., with the processor 604 and/or the main memory 606) and other components of the compute circuitry 602. For example, the I/O subsystem 608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 608 may form a portion of a system-on-a-chip (SoC) and be incorporated, along with one or more of the processor 604, the memory 606, and other components of the compute circuitry 602, into the compute circuitry 602.

The one or more illustrative data storage devices/disks 610 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 610 may include a system partition that stores data and firmware code for the data storage device/disk 610. Individual data storage devices/disks 610 may also include one or more operating system partitions that store data files and executables for operating systems depending on, for example, the type of compute node 600.

The communication circuitry 612 may be embodied as any communication circuit, device, or collection thereof, capable of enabling communications over a network between the compute circuitry 602 and another compute device (e.g., an edge gateway of an implementing edge computing system). The communication circuitry 612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 612 includes a network interface controller (NIC) 620, which may also be referred to as a host fabric interface (HFI). The NIC 620 may be embodied as one or more add-in-boards, daughter cards, network interface cards, controller chips, chipsets, or other devices that may be used by the compute node 600 to connect with another compute device (e.g., an edge gateway node). In some examples, the NIC 620 may be embodied as part of a system-on-a-chip (SoC) that includes one or more processors, or included on a multichip package that also contains one or more processors. In some examples, the NIC 620 may include a local processor (not shown) and/or a local memory (not shown) that are both local to the NIC 620. In such examples, the local processor of the NIC 620 may be capable of performing one or more of the functions of the compute circuitry 602 described herein. Additionally, or alternatively, in such examples, the local memory of the NIC 620 may be integrated into one or more components of the client compute node at the board level, socket level, chip level, and/or other levels.

Additionally, in some examples, a respective compute node 600 may include one or more peripheral devices 614. Such peripheral devices 614 may include any type of peripheral device found in a compute device or server such as audio input devices, a display, other input/output devices, interface devices, and/or other peripheral devices, depending on the particular type of the compute node 600. In further examples, the compute node 600 may be embodied by a respective edge compute node (whether a client, gateway, or aggregation node) in an edge computing system or like forms of appliances, computers, subsystems, circuitry, or other components.

In a more detailed example, FIG. 6B illustrates a block diagram of an example of components that may be present in an edge computing node 650 for implementing the techniques (e.g., operations, processes, methods, and methodologies) described herein. This edge computing node 650 provides a closer view of the respective components of node 600 when implemented as or as part of a computing device (e.g., as a mobile device, a base station, server, gateway, etc.). The edge computing node 650 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 650, or as components otherwise incorporated within a chassis of a larger system.

The edge computing device 650 may include processing circuitry in the form of a processor 652, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 652 may be a part of a system on a chip (SoC) in which the processor 652 and other components are formed into a single integrated circuit, or a single package, such as the Edison™ or Galileo™ SoC boards from Intel Corporation, Santa Clara, California. As an example, the processor 652 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 652 and accompanying circuitry may be provided in a single socket form factor, multiple socket form factor, or a variety of other formats, including in limited hardware configurations or configurations that include fewer than all elements shown in FIG. 6B.

The processor 652 may communicate with a system memory 654 over an interconnect 656 (e.g., a bus). Any number of memory devices may be used to provide for a given amount of system memory. As examples, the memory 654 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example, the storage 658 may be implemented via a solid-state disk drive (SSDD). Other devices that may be used for the storage 658 include flash memory cards, such as Secure Digital (SD) cards, microSD cards, extreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 656 may couple the processor 652 to a transceiver 666, for communications with the connected edge devices 662. The transceiver 666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 666 (or multiple transceivers) may communicate using multiple standards or radios for communications at a different range. For example, the edge computing node 650 may communicate with close devices, e.g., within about 10 meters, using a local transceiver based on Bluetooth Low Energy (BLE), or another low power radio, to save power. More distant connected edge devices 662, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 666 (e.g., a radio transceiver) may be included to communicate with devices or services in a cloud (e.g., an edge cloud 695) via local or wide area network protocols. The wireless network transceiver 666 may be a low-power wide-area (LPWA) transceiver that follows the IEEE 802.15.4, or IEEE 802.15.4g standards, among others. The edge computing node 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 666, as described herein. For example, the transceiver 666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 668 may be included to provide a wired communication to nodes of the edge cloud 695 or to other devices, such as the connected edge devices 662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to enable connecting to a second network, for example, a first NIC 668 providing communications to the cloud over Ethernet, and a second NIC 668 providing communications to other devices over another type of network.

Given the variety of types of applicable communications from the device to another component or network, applicable communications circuitry used by the device may include or be embodied by any one or more of components 664, 666, 668, or 670. Accordingly, in various examples, applicable means for communicating (e.g., receiving, transmitting, etc.) may be embodied by such communications circuitry.

The edge computing node 650 may include or be coupled to acceleration circuitry 664, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 656 may couple the processor 652 to a sensor hub or external interface 670 that is used to connect additional devices or subsystems. The devices may include sensors 672, such as accelerometers, level sensors, flow sensors, optical light sensors, camera sensors, temperature sensors, global navigation system (e.g., GPS) sensors, pressure sensors, barometric pressure sensors, and the like. The hub or interface 670 further may be used to connect the edge computing node 650 to actuators 674, such as power switches, valve actuators, an audible sound generator, a visual warning device, and the like.

In some optional examples, various input/output (I/O) devices may be present within or connected to, the edge computing node 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 650. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 676 may power the edge computing node 650, although, in examples in which the edge computing node 650 is mounted in a fixed location, it may have a power supply coupled to an electrical grid, or the battery may be used as a backup or for temporary capabilities. The battery 676 may be a lithium ion battery, or a metal-air battery, such as a zinc-air battery, an aluminum-air battery, a lithium-air battery, and the like.

A battery monitor/charger 678 may be included in the edge computing node 650 to track the state of charge (SoCh) of the battery 676, if included. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 678 may communicate the information on the battery 676 to the processor 652 over the interconnect 656. The battery monitor/charger 678 may also include an analog-to-digital (ADC) converter that enables the processor 652 to directly monitor the voltage of the battery 676 or the current flow from the battery 676. The battery parameters may be used to determine actions that the edge computing node 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the edge computing node 650. A wireless battery charging circuit, such as an LTC4020 chip from Linear Technologies of Milpitas, California, among others, may be included in the battery monitor/charger 678. The specific charging circuits may be selected based on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

In an example, the instructions 682 provided via the memory 654, the storage 658, or the processor 652 may be embodied as a non-transitory, machine-readable medium 660 including code to direct the processor 652 to perform electronic operations in the edge computing node 650. The processor 652 may access the non-transitory, machine-readable medium 660 over the interconnect 656. For instance, the non-transitory, machine-readable medium 660 may be embodied by devices described for the storage 658 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 660 may include instructions to direct the processor 652 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 682 on the processor 652 (separately, or in combination with the instructions 682 of the machine readable medium 660) may configure execution or operation of a trusted execution environment (TEE) 690. In an example, the TEE 690 operates as a protected area accessible to the processor 652 for secure execution of instructions and secure access to data. Various implementations of the TEE 690, and an accompanying secure area in the processor 652 or the memory 654 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 650 through the TEE 690 and the processor 652.

Figure 7:
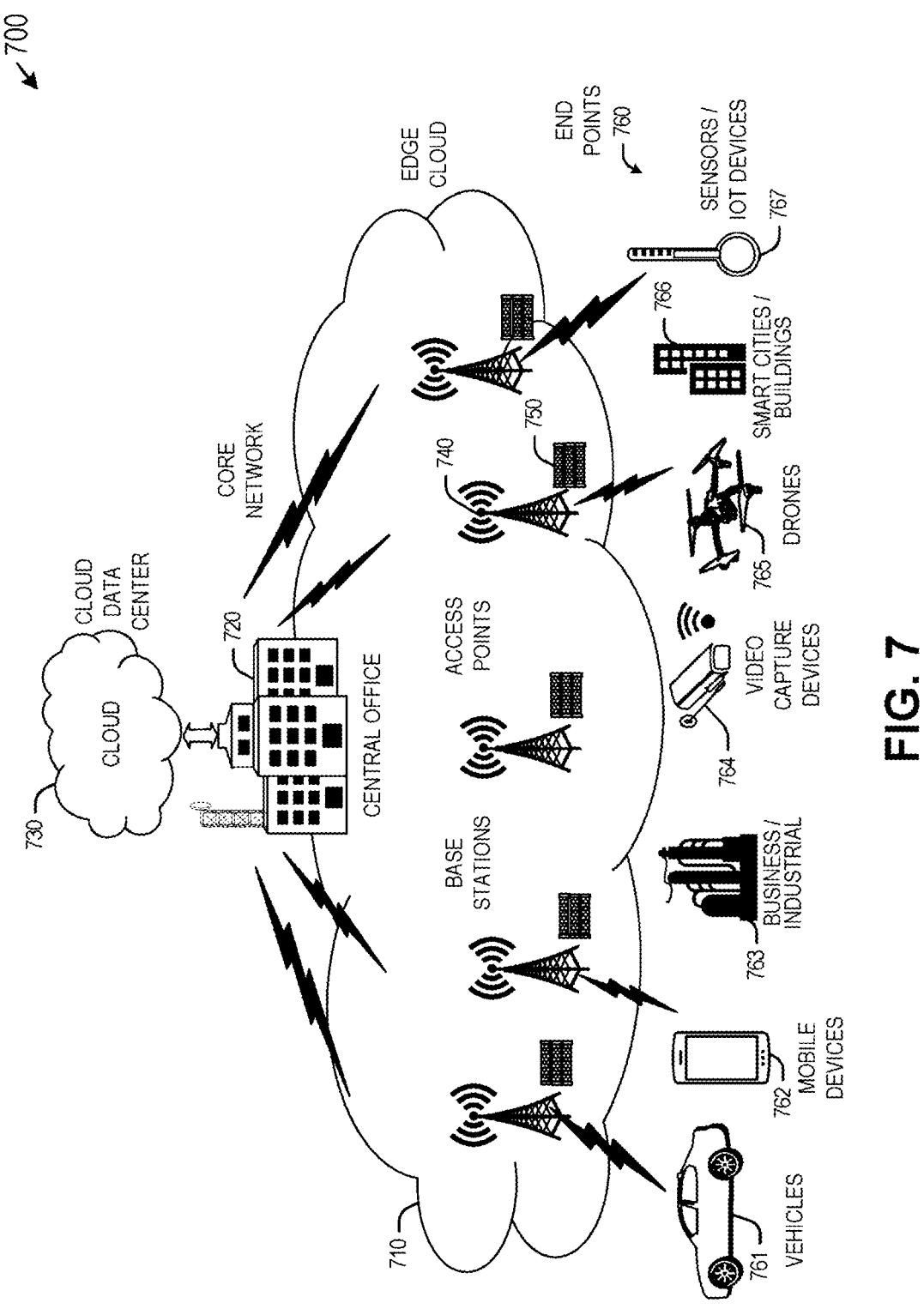
FIG. 7 is a block diagram showing an overview of a configuration for edge computing, according to an embodiment.

FIG. 7 is a block diagram showing an overview of a configuration for edge computing, which includes a layer of processing referred to in many of the following examples as an "edge cloud." As shown, the edge cloud 710 is co-located at an edge location, such as an access point or base station 740, a local processing hub 750, or a central office 720, and thus may include multiple entities, devices, and equipment instances. The edge cloud 710 is located much closer to the endpoint (consumer and producer) data sources 760 (e.g., autonomous vehicles 761, user equipment 762, business and industrial equipment 763, video capture devices 764, drones 765, smart cities and building devices 766, sensors and IoT devices 767, etc.) than the cloud data center 730. Compute, memory, and storage resources which are offered at the edges in the edge cloud 710 are critical to providing ultra-low latency response times for services and functions used by the endpoint data sources 760 as well as reduce network backhaul traffic from the edge cloud 710 toward cloud data center 730 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce an amount or number of resources needed for network services, through the distribution of more resources which are located closer both geographically and in network access time. In this manner, edge computing attempts to bring the compute resources to the workload data where appropriate or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge," "close edge," "local edge," "middle edge," or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 8:
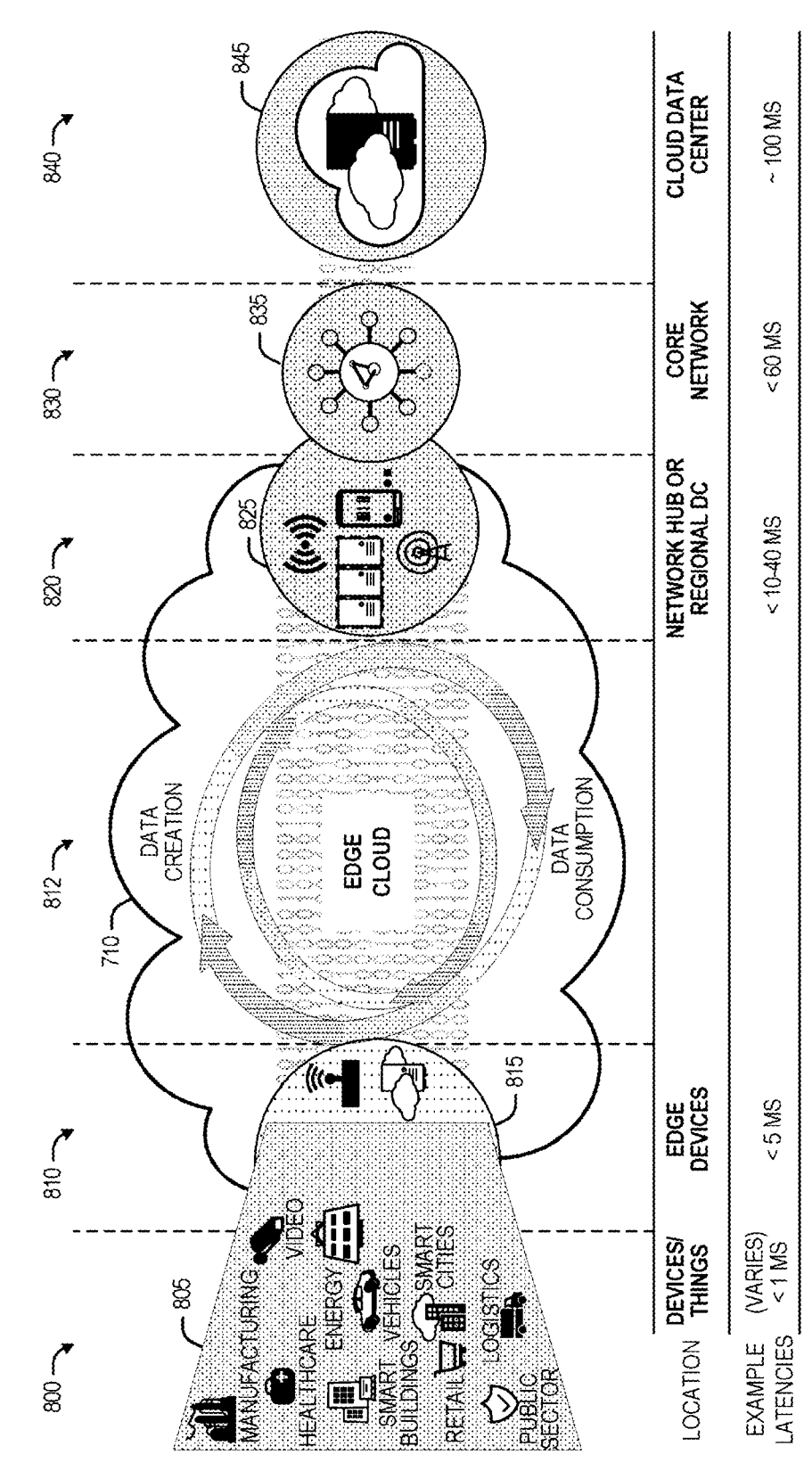
FIG. 8 illustrates operational layers among endpoints, an edge cloud, and cloud computing environments, according to an embodiment.

FIG. 8 illustrates operational layers among endpoints, an edge cloud, and cloud computing environments 800, according to an embodiment. Specifically, FIG. 8 depicts examples of computational use cases 805, utilizing the edge cloud 710 among multiple illustrative layers of network computing. The layers begin at an endpoint (devices and things) layer 800, which accesses the edge cloud 710 to conduct data creation, analysis, and data consumption activities. The edge cloud 710 may span multiple network layers, such as an edge devices layer 810 having gateways, on-premise servers, or network equipment (nodes 815) located in physically proximate edge systems; a network access layer 820, encompassing base stations, radio processing units, network hubs, regional data centers (DC), or local network equipment (equipment 825); and any equipment, devices, or nodes located therebetween (in layer 812, not illustrated in detail). The network communications within the edge cloud 710 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 800, under 5 ms at the edge devices layer 810, to even between 10 to 40 ms when communicating with nodes at the network access layer 820. Beyond the edge cloud 710 are core network 830 and cloud data center 840 layers, each with increasing latency (e.g., between 50-60 ms at the core network layer 830, to 100 or more ms at the cloud data center layer). As a result, operations at a core network data center 835 or a cloud data center 845, with latencies of at least 50 to 100 ms or more, will not be able to accomplish many time-critical functions of the use cases 805. Each of these latency values are provided for purposes of illustration and contrast; it will be understood that the use of other access network mediums and technologies may further reduce the latencies. In some examples, respective portions of the network may be categorized as "close edge," "local edge," "near edge," "middle edge," or "far edge" layers, relative to a network source and destination. For instance, from the perspective of the core network data center 835 or a cloud data center 845, a central office or content data network may be considered as being located within a "near edge" layer ("near" to the cloud, having high latency values when communicating with the devices and endpoints of the use cases 805), whereas an access point, base station, on-premise server, or network gateway may be considered as located within a "far edge" layer ("far" from the cloud, having low latency values when communicating with the devices and endpoints of the use cases 805). It will be understood that other categorizations of a particular network layer as constituting a "close," "local," "near," "middle," or "far" edge may be based on latency, distance, number of network hops, or other measurable characteristics, as measured from a source in any of the network layers 800-840.

The various use cases 805 may access resources under usage pressure from incoming streams, due to multiple services utilizing the edge cloud. To achieve results with low latency, the services executed within the edge cloud 710 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, work-flows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 710 may provide the ability to serve and respond to multiple applications of the use cases 805 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 710 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 710 (network layers 800-840), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco," or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 710.

As such, the edge cloud 710 is formed from network components and functional features operated by and within edge gateway nodes, edge aggregation nodes, or other edge compute nodes among network layers 810-830. The edge cloud 710 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 710 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 710 may be servers, multi-tenant servers, appliance computing devices, and/or any other type of computing devices. For example, the edge cloud 710 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 6B. The edge cloud 710 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Figure 9:
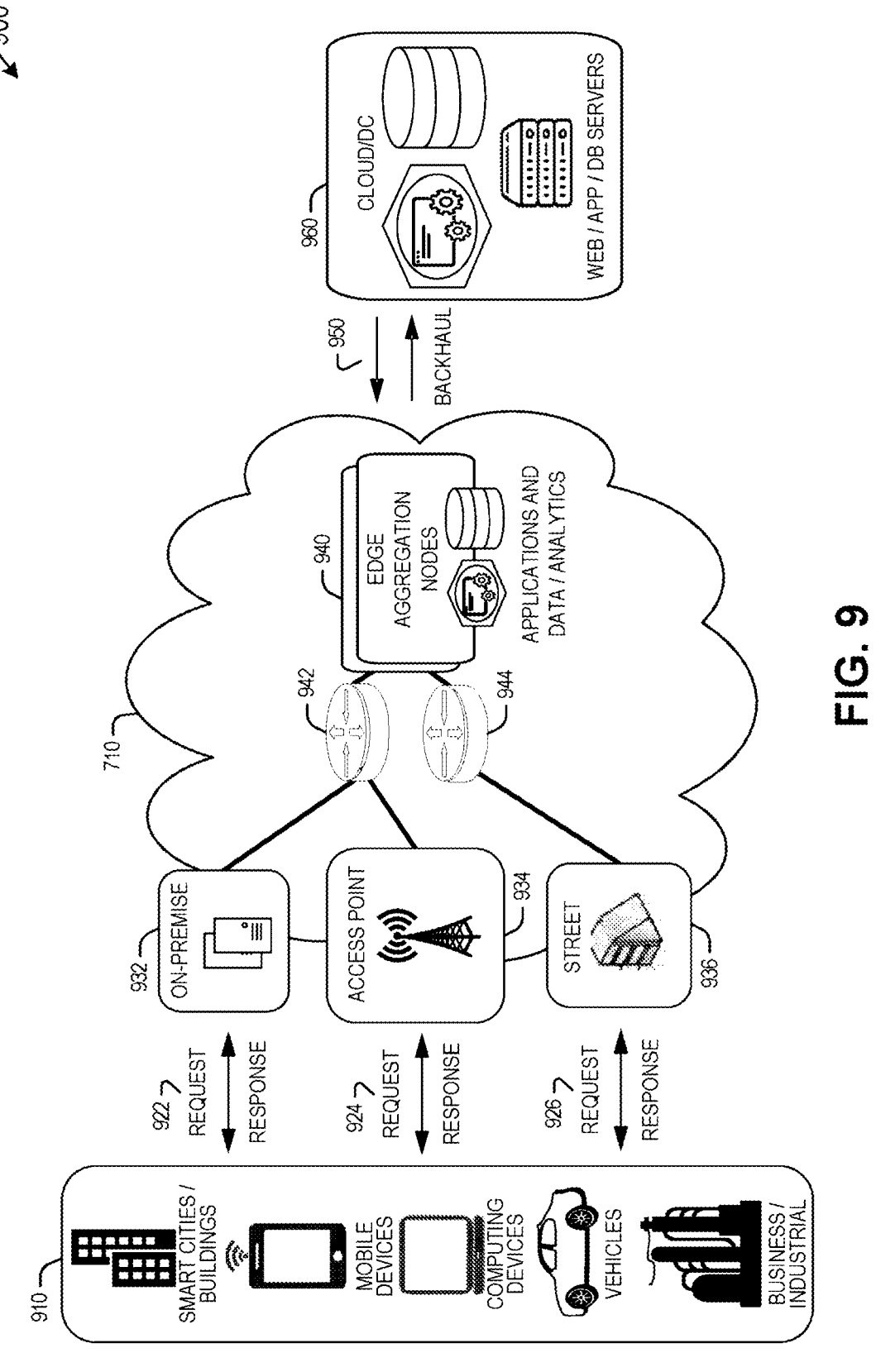
FIG. 9 illustrates an example approach for networking and services in an edge computing system, according to an embodiment.

FIG. 9 illustrates an example approach for networking and services in an edge computing system, according to an embodiment. In FIG. 9, various client endpoints 910 (in the form of mobile devices, computers, autonomous vehicles, business computing equipment, industrial processing equipment) exchange requests and responses that are specific to the type of endpoint network aggregation. For instance, client endpoints 910 may obtain network access via a wired broadband network, by exchanging requests and responses 922 through an on-premises network system 932. Some client endpoints 910, such as mobile computing devices, may obtain network access via a wireless broadband network, by exchanging requests and responses 924 through an access point (e.g., cellular network tower) 934. Some client endpoints 910, such as autonomous vehicles may obtain network access for requests and responses 926 via a wireless vehicular network through a street-located network system 936. However, regardless of the type of network access, the TSP may deploy aggregation points 942, 944 within the edge cloud 710 to aggregate traffic and requests. Thus, within the edge cloud 710, the TSP may deploy various compute and storage resources, such as at edge aggregation nodes 940, to provide requested content. The edge aggregation nodes 940 and other systems of the edge cloud 710 are connected to a cloud or data center 960, which uses a backhaul network 950 to fulfill higher-latency requests from a cloud/data center for websites, applications, database servers, etc. Additional or consolidated instances of the edge aggregation nodes 940 and the aggregation points 942, 944, including those deployed on a single server framework, may also be present within the edge cloud 710 or other areas of the TSP infrastructure.

FIG. 10 illustrates an example software distribution platform 1005 to distribute software, according to an embodiment. The software distribution platform 1005 may include the example computer readable instructions 682 of FIG. 6B, to one or more devices, such as example processor platform(s) 1015 and/or example connected edge devices 810 of FIG. 8. The example software distribution platform 1005 may be implemented by any computer server, data facility, cloud service, etc., capable of storing and transmitting software to other computing devices (e.g., third parties, the example connected edge devices 810 of FIG. 8). Example connected edge devices may be customers, clients, managing devices (e.g., servers), third parties (e.g., customers of an entity owning and/or operating the software distribution platform 1005). Example connected edge devices may operate in commercial and/or home automation environments. In some examples, a third party is a developer, a seller, and/or a licensor of software such as the example computer readable instructions 682 of FIG. 6B. The third parties may be consumers, users, retailers, OEMs, etc., that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 10, the software distribution platform 1005 includes one or more servers and one or more storage devices. The storage devices store the computer readable instructions 682, which may correspond to the example computer readable instructions 682 of FIG. 6B, as described above. The one or more servers of the example software distribution platform 1005 are in communication with a network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer readable instructions 682 from the software distribution platform 1005. For example, the software, which may correspond to the example computer readable instructions 682 of FIG. 6B may be downloaded to the example processor platform(s) 1015 (e.g., example connected edge devices), which is/are to execute the computer readable instructions 682 to implement non-dominant resource management for edge multi-tenant applications. In some examples, one or more servers of the software distribution platform 1005 are communicatively connected to one or more security domains and/or security devices through which requests and transmissions of the example computer readable instructions 682 must pass. In some examples, one or more servers of the software distribution platform 1005 periodically offer, transmit, and/or force updates to the software (e.g., the example computer readable instructions 682 of FIG. 6B) to ensure improvements, patches, updates, etc., are distributed and applied to the software at the end user devices.

In the illustrated example of FIG. 10, the computer readable instructions 682 are stored on storage devices of the software distribution platform 1005 in a particular format. A format of computer readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.). In some examples, the computer readable instructions 682 stored in the software distribution platform 1005 are in a first format when transmitted to the example processor platform(s) 1015. In some examples, the first format is an executable binary in which particular types of the processor platform(s) 1015 can execute. However, in some examples, the first format is uncompiled code that requires one or more preparation tasks to transform the first format to a second format to enable execution on the example processor platform(s) 1015. For instance, the receiving processor platform(s) 1015 may need to compile the computer readable instructions 682 in the first format to generate executable code in a second format that is capable of being executed on the processor platform(s) 1015. In still other examples, the first format is interpreted code that, upon reaching the processor platform(s) 1015, is interpreted by an interpreter to facilitate execution of instructions.

Figure 11:
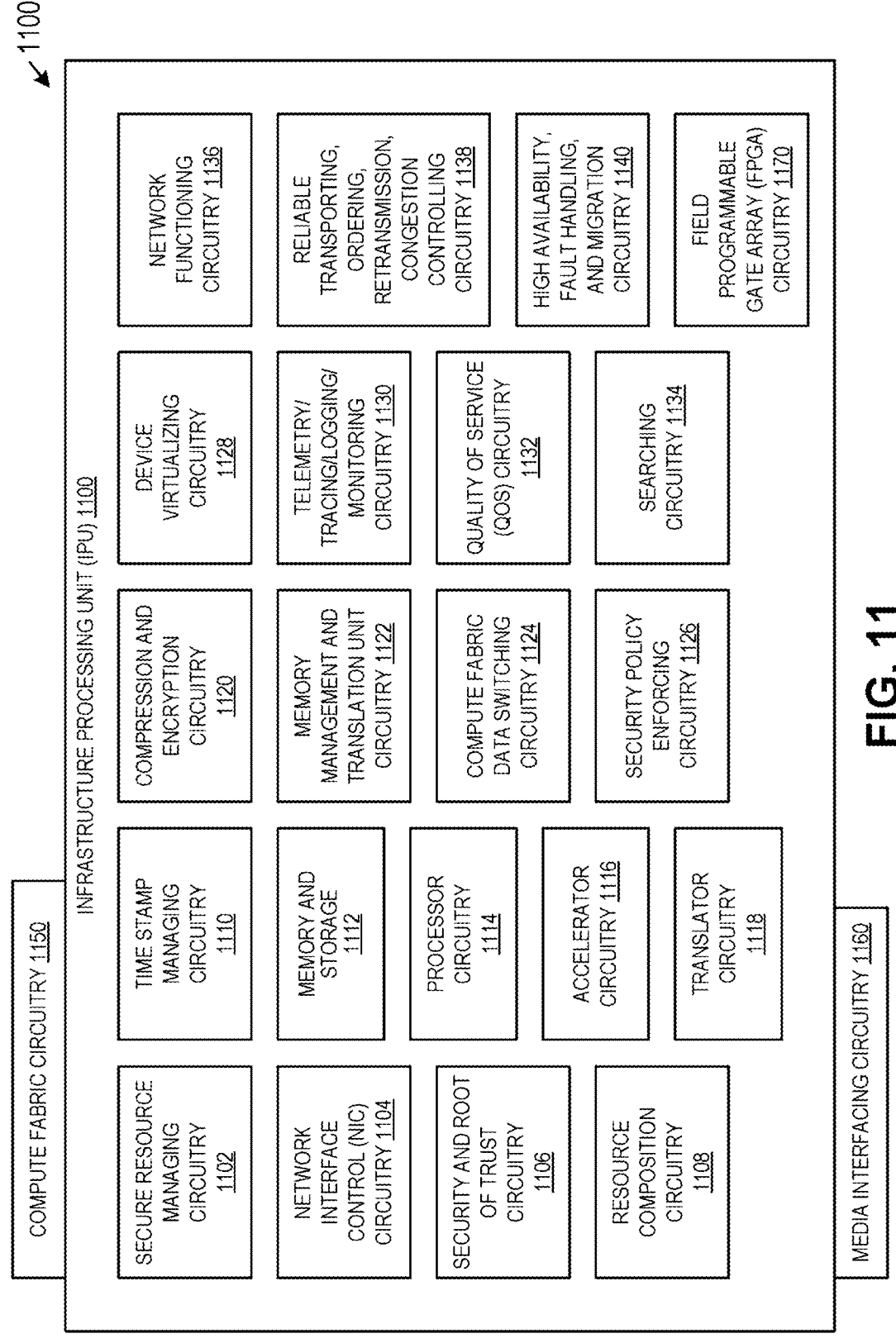
FIG. 11 depicts an example of an Infrastructure Processing Unit (IPU), according to an embodiment.

FIG. 11 depicts an example of an infrastructure processing unit (IPU). Different examples of IPUs disclosed herein enable improved performance, management, security and coordination functions between entities (e.g., cloud service providers), and enable infrastructure offload or communications coordination functions. As disclosed in further detail below, IPUs may be integrated with smart NICs and storage or memory (e.g., on a same die, system on chip (SoC), or connected dies) that are located at on-premises systems, base stations, gateways, neighborhood central offices, and so forth. Different examples of one or more IPUs disclosed herein can perform an application including any number of microservices, where each microservice runs in its own process and communicates using protocols (e.g., an HTTP resource API, message service or gRPC). Microservices can be independently deployed using centralized management of these services. A management system may be written in different programming languages and use different data storage technologies.

Furthermore, one or more IPUs can execute platform management, networking stack processing operations, security (crypto) operations, storage software, identity and key management, telemetry, logging, monitoring and service mesh (e.g., control how different microservices communicate with one another). The IPU can access an xPU to offload performance of various tasks. For instance, an IPU exposes XPU, storage, memory, and CPU resources and capabilities as a service that can be accessed by other microservices for function composition. This can improve performance and reduce data movement and latency. An IPU can perform capabilities such as those of a router, load balancer, firewall, TCP/reliable transport, a service mesh (e.g., proxy or API gateway), security, data-transformation, authentication, quality of service (QoS), security, telemetry measurement, event logging, initiating and managing data flows, data placement, or job scheduling of resources on an xPU, storage, memory, or CPU.

In the illustrated example of FIG. 11, the IPU 1100 includes or otherwise accesses secure resource managing circuitry 1102, network interface controller (NIC) circuitry 1104, security and root of trust circuitry 1106, resource composition circuitry 1108, time stamp managing circuitry 1110, memory and storage 1112, processing circuitry 1114, accelerator circuitry 1116, or translator circuitry 1118. Any number or combination of other structure(s) can be used such as but not limited to compression and encryption circuitry 1120, memory management and translation unit circuitry 1122, compute fabric data switching circuitry 1124, security policy enforcing circuitry 1126, device virtualizing circuitry 1128, telemetry, tracing, logging and monitoring circuitry 1130, quality of service circuitry 1132, searching circuitry 1134, network functioning circuitry (e.g., routing, firewall, load balancing, network address translating (NAT), etc.) 1136, reliable transporting, ordering, retransmission, congestion controlling circuitry 1138, and high availability, fault handling and migration circuitry 1140 shown in FIG. 11. Different examples can use one or more structures (components) of the example IPU 1100 together or separately. For example, compression and encryption circuitry 1120 can be used as a separate service or chained as part of a data flow with vSwitch and packet encryption.

In some examples, IPU 1100 includes a field programmable gate array (FPGA) 1170 structured to receive commands from an CPU, XPU, or application via an API and perform commands/tasks on behalf of the CPU, including workload management and offload or accelerator operations. The illustrated example of FIG. 11 may include any number of FPGAs configured or otherwise structured to perform any operations of any IPU described herein.

Example compute fabric circuitry 1150 provides connectivity to a local host or device (e.g., server or device (e.g., xPU, memory, or storage device)). Connectivity with a local host or device or smartNIC or another IPU is, in some examples, provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), Hyper-Transport, NVLink, Advanced Microcontroller Bus Architecture (AMBA) interconnect, OpenCAPI, Gen-Z, CCIX, Infinity Fabric (IF), and so forth. Different examples of the host connectivity provide symmetric memory and caching to enable equal peering between CPU, XPU, and IPU (e.g., via CXL.cache and CXL.mem).

Example media interfacing circuitry 1160 provides connectivity to a remote smartNIC or another IPU or service via a network medium or fabric. This can be provided over any type of network media (e.g., wired or wireless) and using any protocol (e.g., Ethernet, InfiniBand, Fiber channel, ATM, to name a few).

In some examples, instead of the server/CPU being the primary component managing IPU 1100, IPU 1100 is a root of a system (e.g., rack of servers or data center) and manages compute resources (e.g., CPU, xPU, storage, memory, other IPUs, and so forth) in the IPU 1100 and outside of the IPU 1100. Different operations of an IPU are described below.

In some examples, the IPU 1100 performs orchestration to decide which hardware or software is to execute a workload based on available resources (e.g., services and devices) and considers service level agreements and latencies, to determine whether resources (e.g., CPU, xPU, storage, memory, etc.) are to be allocated from the local host or from a remote host or pooled resource. In examples when the IPU 1100 is selected to perform a workload, secure resource managing circuitry 1102 offloads work to a CPU, xPU, or other device and the IPU 1100 accelerates connectivity of distributed runtimes, reduce latency, CPU and increases reliability.

In some examples, secure resource managing circuitry 1102 runs a service mesh to decide what resource is to execute workload, and provide for L7 (application layer) and remote procedure call (RPC) traffic to bypass kernel altogether so that a user space application can communicate directly with the example IPU 1100 (e.g., IPU 1100 and application can share a memory space). In some examples, a service mesh is a configurable, low-latency infrastructure layer designed to handle communication among application microservices using application programming interfaces (APIs) (e.g., over remote procedure calls (RPCs)). The example service mesh provides fast, reliable, and secure communication among containerized or virtualized application infrastructure services. The service mesh can provide critical capabilities including, but not limited to service discovery, load balancing, encryption, observability, traceability, authentication and authorization, and support for the circuit breaker pattern.

In some examples, infrastructure services include a composite node created by an IPU at or after a workload from an application is received. In some cases, the composite node includes access to hardware devices, software using APIs, RPCs, gRPCs, or communications protocols with instructions such as, but not limited, to iSCSI, NVMe-oF, or CXL.

In some cases, the example IPU 1100 dynamically selects itself to run a given workload (e.g., microservice) within a composable infrastructure including an IPU, xPU, CPU, storage, memory, and other devices in a node.

In some examples, communications transit through media interfacing circuitry 1160 of the example IPU 1100 through a NIC/smartNIC (for cross node communications) or loopback back to a local service on the same host. Communications through the example media interfacing circuitry 1160 of the example IPU 1100 to another IPU can then use shared memory support transport between xPUs switched through the local IPUs. Use of IPU-to-IPU communication can reduce latency and jitter through ingress scheduling of messages and work processing based on service level objective (SLO).

For example, for a request to a database application that requires a response, the example IPU 1100 prioritizes its processing to minimize the stalling of the requesting application. In some examples, the IPU 1100 schedules the prioritized message request issuing the event to execute a SQL query database and the example IPU constructs microservices that issue SQL queries and the queries are sent to the appropriate devices or services.

Example 1 is a system for provisioning of a trained artificial intelligence (AI) model, the system comprising: processor circuitry; and a memory that includes, instructions, the instructions, when executed by the processor circuitry, cause the processor circuitry to: receive a deployment request for an AI model from a client device; send a remote attestation request to the client device in response to the deployment request; receive a remote attestation response from the client device; verify the remote attestation response; generate an encrypted model based on the AI model in response to verifying the remote attestation response; and send the encrypted model to a first trusted environment within the client device.

In Example 2, the subject matter of Example 1 includes, the instructions further cause the processor circuitry to send the encrypted model to a second trusted environment associated with an accelerator within the client device; wherein: the first trusted environment includes a first security architecture specific to the client device; and the second trusted environment includes a second architecture that is specific to the accelerator and different from the first security architecture.

In Example 3, the subject matter of Examples 1-2 includes, the instructions further cause the processor circuitry to: generate a symmetric key to encrypt the AI model in response to verifying the remote attestation response, wherein the encrypted model is generated further based on the symmetric key; generate a wrapped key based on the symmetric key; and send the wrapped key to the client device.

In Example 4, the subject matter of Example 3 includes, the instructions further cause the processor circuitry to provision an attestation key for a client computing device prior to receiving the deployment request.

In Example 5, the subject matter of Example 4 includes, wherein provisioning the attestation key for the client computing device includes storing the attestation key within a confidentiality-protected client memory on the client device.

In Example 6, the subject matter of Example 5 includes, wherein the confidentiality-protected client memory includes at least one of a confidentiality-protected dynamic random-access memory and a confidentiality-protected flash storage.

In Example 7, the subject matter of Examples 4-6 includes, wherein receiving the remote attestation response includes receiving a device quote signed by the attestation key.

In Example 8, the subject matter of Examples 4-7 includes, the instructions further cause the processor circuitry to: receive a unique device key pair and an attestation certificate chain for the attestation key generated at the client device; and extract a public key from the attestation certificate chain subsequent to verifying the remote attestation response.

In Example 9, the subject matter of Example 8 includes, wherein generating the wrapped key is further based on the public key.

In Example 10, the subject matter of Examples 1-9 includes, wherein verifying the remote attestation response includes: sending the remote attestation response to an attestation verifier; and receiving a remote attestation verification from the attestation verifier.

In Example 11, the subject matter of Examples 1-10 includes, the instructions further cause the processor circuitry to receive a trained model from the client device, the trained model generated by retraining the AI model at the client device.

Example 12 is a method for provisioning of a trained artificial intelligence (AI) model, the method comprising: receiving a deployment request for an AI model from a client device; sending a remote attestation request to the client device in response to the deployment request; receiving a remote attestation response from the client device; verifying the remote attestation response; generating an encrypted model based on the AI model in response to verifying the remote attestation response; and sending the encrypted model to a first trusted environment within the client device.

In Example 13, the subject matter of Example 12 includes, sending the encrypted model to a second trusted environment associated with an accelerator within the client device; wherein: the first trusted environment includes a first security architecture specific to the client device; and the second trusted environment includes a second architecture that is specific to the accelerator and different from the first security architecture.

In Example 14, the subject matter of Examples 12-13 includes, generating a symmetric key to encrypt the AI model in response to verifying the remote attestation response, wherein the encrypted model is generated further based on the symmetric key; generating a wrapped key based on the symmetric key; and sending the wrapped key to the client device.

In Example 15, the subject matter of Example 14 includes, provisioning an attestation key for a client computing device prior to receiving the deployment request.

In Example 16, the subject matter of Example 15 includes, wherein provisioning the attestation key for the client computing device includes storing the attestation key within a confidentiality-protected client memory on the client device.

In Example 17, the subject matter of Example 16 includes, wherein the confidentiality-protected client memory includes at least one of a confidentiality-protected dynamic random-access memory and a confidentiality-protected flash storage.

In Example 18, the subject matter of Examples 15-17 includes, wherein receiving the remote attestation response includes receiving a device quote signed by the attestation key.

In Example 19, the subject matter of Examples 15-18 includes, receiving a unique device key pair and an attestation certificate chain for the attestation key generated at the client device; and extracting a public key from the attestation certificate chain subsequent to verifying the remote attestation response.

In Example 20, the subject matter of Example 19 includes, wherein generating the wrapped key is further based on the public key.

In Example 21, the subject matter of Examples 12-20 includes, wherein verifying the remote attestation response includes: sending the remote attestation response to an attestation verifier; and receiving a remote attestation verification from the attestation verifier.

In Example 22, the subject matter of Examples 12-21 includes, receiving a trained model from the client device, the trained model generated by retraining the AI model at the client device.

Example 23 is at least one non-transitory machine-readable storage medium, comprising instructions that, responsive to being executed with processor circuitry of a computer-controlled device, cause the processor circuitry to: receive a deployment request for an AI model from a client device; send a remote attestation request to the client device in response to the deployment request; receive a remote attestation response from the client device; verify the remote attestation response; generate an encrypted model based on the AI model in response to verifying the remote attestation response; and send the encrypted model to a first trusted environment within the client device.

In Example 24, the subject matter of Example 23 includes, the instructions further causing the processor circuitry to send the encrypted model to a second trusted environment associated with an accelerator within the client device; wherein: the first trusted environment includes a first security architecture specific to the client device; and the second trusted environment includes a second architecture that is specific to the accelerator and different from the first security architecture.

In Example 25, the subject matter of Examples 23-24 includes, the instructions further causing the processor circuitry to: generate a symmetric key to encrypt the AI model in response to verifying the remote attestation response, wherein the encrypted model is generated further based on the symmetric key; generate a wrapped key based on the symmetric key; and send the wrapped key to the client device.

In Example 26, the subject matter of Example 25 includes, the instructions further causing the processor circuitry to provision an attestation key for a client computing device prior to receiving the deployment request.

In Example 27, the subject matter of Example 26 includes, the instructions further causing the processor circuitry to store the attestation key within a confidentiality-protected client memory on the client device.

In Example 28, the subject matter of Example 27 includes, wherein the confidentiality-protected client memory includes at least one of a confidentiality-protected dynamic random-access memory and a confidentiality-protected flash storage.

In Example 29, the subject matter of Examples 26-28 includes, the instructions further causing the processor circuitry to receive a device quote signed by the attestation key.

In Example 30, the subject matter of Examples 26-29 includes, the instructions further causing the processor circuitry to: receive a unique device key pair and an attestation certificate chain for the attestation key generated at the client device; and extract a public key from the attestation certificate chain subsequent to verifying the remote attestation response.

In Example 31, the subject matter of Example 30 includes, wherein generating the wrapped key is further based on the public key.

In Example 32, the subject matter of Examples 23-31 includes, the instructions further causing the processor circuitry to: send the remote attestation response to an attestation verifier; and receive a remote attestation verification from the attestation verifier.

In Example 33, the subject matter of Examples 23-32 includes, the instructions further causing the processor circuitry to receive a trained model from the client device, the trained model generated by retraining the AI model at the client device.

Example 34 is an apparatus for provisioning of a trained artificial intelligence (AI) model, the apparatus comprising: means for receiving a deployment request for an AI model from a client device; means for sending a remote attestation request to the client device in response to the deployment request; means for receiving a remote attestation response from the client device; means for verifying the remote attestation response; means for generating an encrypted model based on the AI model in response to verifying the remote attestation response; and means for sending the encrypted model to the client device.

Example 35 is at least one machine-readable medium including instructions that, when executed by processing circuitry, cause the processing circuitry to perform operations to implement of any of Examples 1-34.

Example 36 is an apparatus comprising means to implement of any of Examples 1-34.

Example 37 is a system to implement of any of Examples 1-34.

Example 38 is a method to implement of any of Examples 1-34.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for provisioning of a trained artificial intelligence (AI) model, the system comprising:
   processor circuitry; and
   a memory that includes instructions, the instructions, when executed by the processor circuitry, cause the processor circuitry to:
   receive a deployment request for an AI model from a client device;
   send a remote attestation request to the client device in response to the deployment request;
   receive a remote attestation response from the client device;
   verify the remote attestation response;
   generate an encrypted model based on the AI model in response to verifying the remote attestation response; and
   send the encrypted model to a first trusted environment within the client device.

2. The system of claim 1, the instructions further cause the processor circuitry to send the encrypted model to a second trusted environment associated with an accelerator within the client device; wherein:
   the first trusted environment includes a first security architecture specific to the client device; and
   the second trusted environment includes a second architecture that is specific to the accelerator and different from the first security architecture.

3. The system of claim 1, the instructions further cause the processor circuitry to:
   generate a symmetric key to encrypt the AI model in response to verifying the remote attestation response, wherein the encrypted model is generated further based on the symmetric key;
   generate a wrapped key based on the symmetric key; and
   send the wrapped key to the client device.

4. The system of claim 3, the instructions further cause the processor circuitry to provision an attestation key for a client computing device prior to receiving the deployment request.

5. The system of claim 4, wherein receiving the remote attestation response includes receiving a device quote signed by the attestation key.

6. The system of claim 4, the instructions further cause the processor circuitry to:
   receive a unique device key pair and an attestation certificate chain for the attestation key generated at the client device; and
   extract a public key from the attestation certificate chain subsequent to verifying the remote attestation response.

7. The system of claim 1, wherein verifying the remote attestation response includes:
   sending the remote attestation response to an attestation verifier; and
   receiving a remote attestation verification from the attestation verifier.

8. The system of claim 1, the instructions further cause the processor circuitry to receive a trained model from the client device, the trained model generated by retraining the AI model at the client device.

9. A method for provisioning of a trained artificial intelligence (AI) model, the method comprising:
   receiving a deployment request for an AI model from a client device;
   sending a remote attestation request to the client device in response to the deployment request;
   receiving a remote attestation response from the client device;
   verifying the remote attestation response;
   generating an encrypted model based on the AI model in response to verifying the remote attestation response; and
   sending the encrypted model to a first trusted environment within the client device.

10. The method of claim 9, further including sending the encrypted model to a second trusted environment associated with an accelerator within the client device; wherein:
   the first trusted environment includes a first security architecture specific to the client device; and
   the second trusted environment includes a second architecture that is specific to the accelerator and different from the first security architecture.

11. The method of claim 9, further including:
   generating a symmetric key to encrypt the AI model in response to verifying the remote attestation response, wherein the encrypted model is generated further based on the symmetric key;
   generating a wrapped key based on the symmetric key; and
   sending the wrapped key to the client device.

12. The method of claim 11, further including provisioning an attestation key for a client computing device prior to receiving the deployment request.

13. The method of claim 12, wherein receiving the remote attestation response includes receiving a device quote signed by the attestation key.

14. The method of claim 12, further including:
   receiving a unique device key pair and an attestation certificate chain for the attestation key generated at the client device; and
   extracting a public key from the attestation certificate chain subsequent to verifying the remote attestation response.

15. The method of claim 9, wherein verifying the remote attestation response includes:
   sending the remote attestation response to an attestation verifier; and
   receiving a remote attestation verification from the attestation verifier.

16. The method of claim 9, further including receiving a trained model from the client device, the trained model generated by retraining the AI model at the client device.

17. At least one non-transitory machine-readable storage medium, comprising instructions that, responsive to being executed with processor circuitry of a computer-controlled device, cause the processor circuitry to:

receive a deployment request for an AI model from a client device;

send a remote attestation request to the client device in response to the deployment request;

receive a remote attestation response from the client device;

verify the remote attestation response;

generate an encrypted model based on the AI model in response to verifying the remote attestation response; and send the encrypted model to a first trusted environment within the client device.

18. The at least one non-transitory machine-readable storage medium of claim 17, the instructions further causing the processor circuitry to send the encrypted model to a second trusted environment associated with an accelerator within the client device; wherein:

the first trusted environment includes a first security architecture specific to the client device; and the second trusted environment includes a second architecture that is specific to the accelerator and different from the first security architecture.

19. The at least one non-transitory machine-readable storage medium of claim 17, the instructions further causing the processor circuitry to:

generate a symmetric key to encrypt the AI model in response to verifying the remote attestation response, wherein the encrypted model is generated further based on the symmetric key;

generate a wrapped key based on the symmetric key; and send the wrapped key to the client device.

20. The at least one non-transitory machine-readable storage medium of claim 19, the instructions further causing the processor circuitry to provision an attestation key for a client computing device prior to receiving the deployment request.

* * * * *